United States Patent
Matsuzaki et al.

(10) Patent No.: US 6,885,382 B1
(45) Date of Patent: Apr. 26, 2005

(54) IMAGE PROCESSING DEVICE, IMAGE PROCESSING SYSTEM, OUTPUT DEVICE, COMPUTER READABLE RECORDING MEDIUM AND IMAGE PROCESSING METHOD

(75) Inventors: Tomoyasu Matsuzaki, Nakai-machi (JP); Hiroaki Ikegami, Nakai-machi (JP); Hitoshi Ogatsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1009 days.

(21) Appl. No.: 09/640,778

(22) Filed: Aug. 18, 2000

(30) Foreign Application Priority Data

Aug. 18, 1999 (JP) .......................................... 11-232029
Jul. 11, 2000 (JP) ...................................... 2000-210059

(51) Int. Cl.[7] .............................................. G09G 5/02
(52) U.S. Cl. ...................... 345/600; 345/589; 345/590; 345/591; 345/592; 345/593
(58) Field of Search ................................. 345/600, 589, 345/590, 591, 592, 593

(56) References Cited

U.S. PATENT DOCUMENTS 5,572,599 A * 11/1996 Tse ............................. 382/162
5,900,952 A *  5/1999 Fan ............................. 358/518

FOREIGN PATENT DOCUMENTS

| JP | 8-102865 | 4/1996 |
| JP | 8-149322 | 6/1996 |
| JP | 10-65930 | 3/1998 |
| JP | 10-210313 | 8/1998 |
| JP | 10-262157 | 9/1998 |

OTHER PUBLICATIONS

Ohta, N., "Shikisai Kougaka (Color Engineering)", Tokyo Denki University Press., 1933, pp. 184–191.
Luo, R.M., et al., "The Structure of the CIE 1997 Colour Appearance Model (CIECAM97s)", Color and Imaging Institute, University of Derby, pp. 138–146.
ICC Profile Format Specification, International Color Consortium, Nov. 20, 1995, pp. 1–66.

* cited by examiner

Primary Examiner—Matthew C. Bella
Assistant Examiner—Mike Rahmjoo
(74) Attorney, Agent, or Firm—Morgan Lewis & Bockius LLP

(57) ABSTRACT

An image processing device can reproduce the original color of an electronic document on an output device faithfully and can simulate the appearance of color of a recorded product on a display device accurately. Color temperature information of an electronic document is recognized by an electronic document color temperature information recognition unit and delivered to a first color correction conversion unit. The first color correction conversion unit carries out color conversion based on the color temperature information of the electronic document so that a recorded product output from an output device assumes substantially the same color as the electronic document when it is observed under an illumination light source having a color temperature indicated by the color temperature information of the electronic document. An image is formed by the output device based on the color converted image signal to output the recorded product.

13 Claims, 28 Drawing Sheets

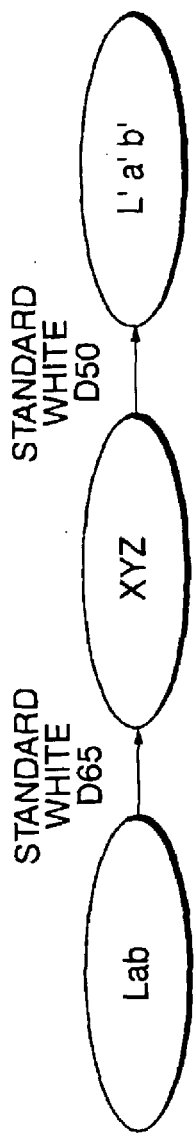
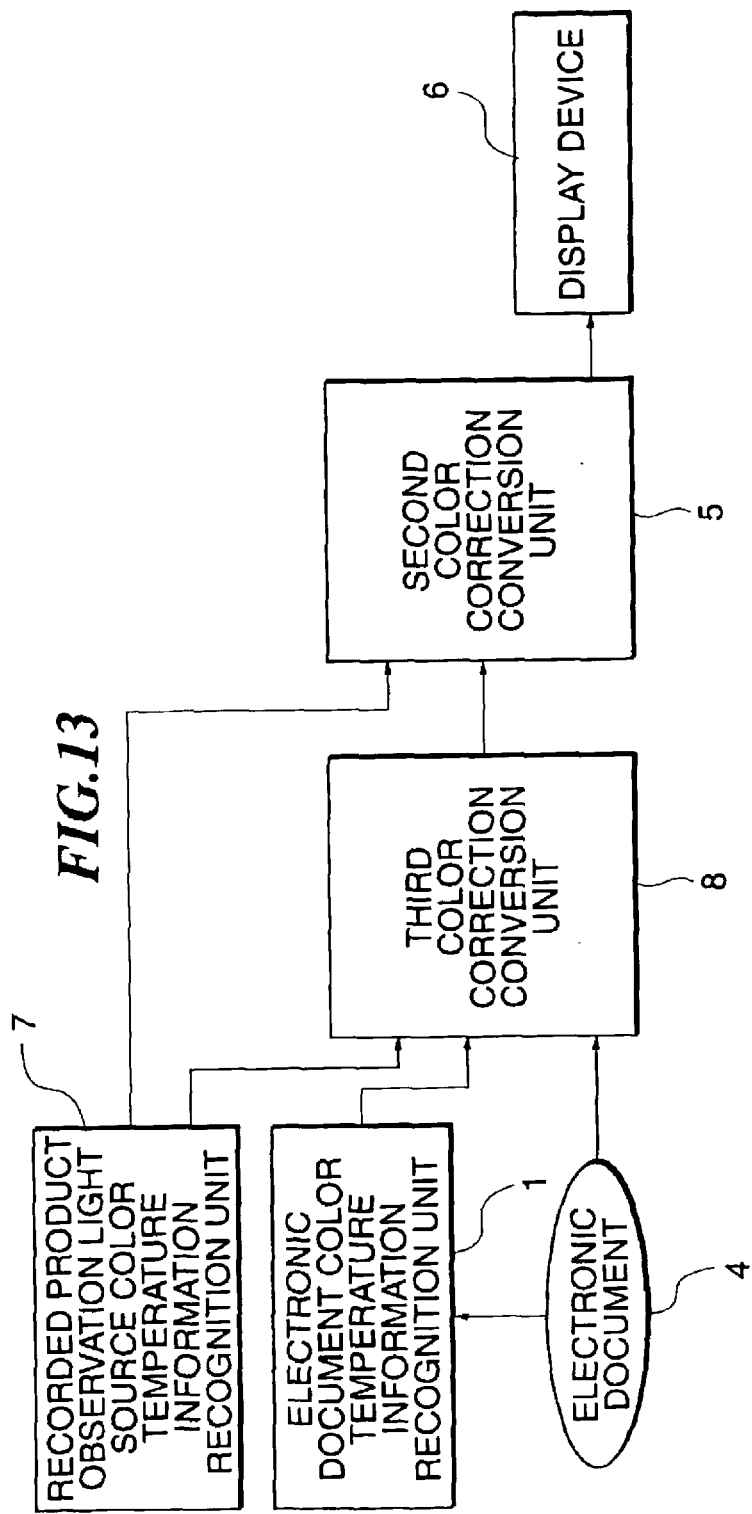
FIG.12
FIG.13

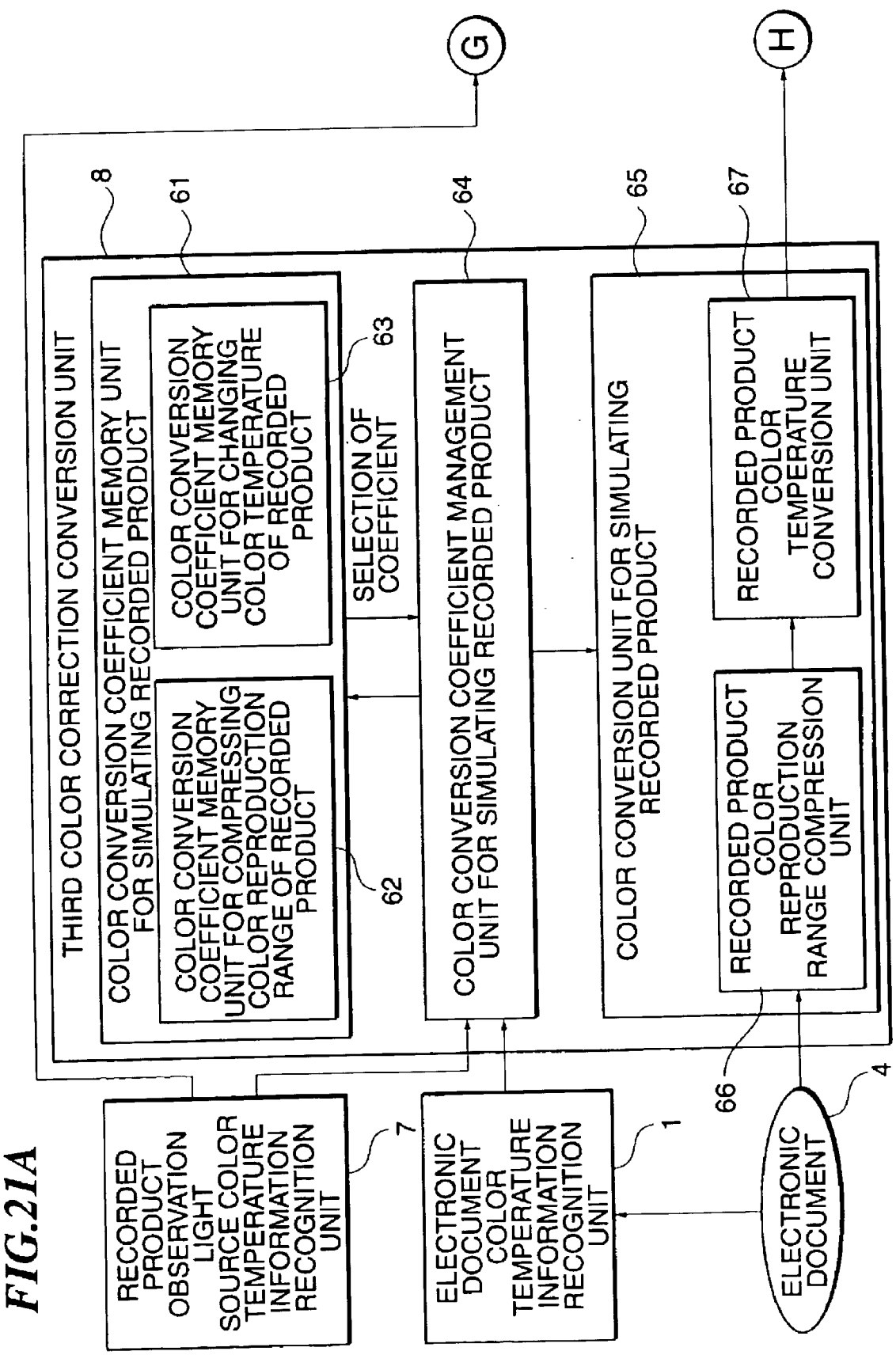

FIG.25

| | |
|---|---|
| OUTPUT MODE | DOCUMENT FAITHFUL REPRODUCTION MODE |
| DOCUMENT COLOR TEMPERATURE | 5000K |
| PRINT SIMULATION MODE | |
| OBSERVATION ENVIRONMENT LIGHT COLOR TEMPERATURE | 4000K |
| COLOR MATERIAL | JapanColor |
| GAMUT ALARM | NONE |

FIG.26A

| DISPLAY MODES |
|---|
| DOCUMENT FAITHFUL REPRODUCTION MODE<br>PRINT SIMULATION MODE<br>NON-COLOR CORRECTION |

FIG.26B

| DOCUMENT COLOR TEMPERATURE |
|---|
| AUTOMATIC<br>5000K<br>6500K<br>. . . . |

FIG.26C

| PRINT SIMULATION MODE DEDICATED FUNCTIONS | |
|---|---|
| OBSERVATION ENVIRONMENT LIGHT COLOR TEMPERATURE<br>3000K<br>4000K<br>5000K<br>6500K<br>. . . . | COLOR MATERIAL<br>PHOTO<br>. . . .<br>PRINT<br>JapanColor<br>EuroColor<br>SWOP<br>. . . .<br>ELECTROPHOTOGRAPH<br>PRINTER 1<br>PRINTER 2<br>. . . .<br>INK JET<br>PRINTER 1<br>PRINTER 2<br>. . . .<br>. . . .<br>. . . . |
| EXISTENCE OF GAMUT ALARM<br>ON<br>OFF | |

IMAGE PROCESSING DEVICE, IMAGE PROCESSING SYSTEM, OUTPUT DEVICE, COMPUTER READABLE RECORDING MEDIUM AND IMAGE PROCESSING METHOD

BACKGROUND OF THE INVENTION

1. Field of the Invention

The present invention relates to an output device for outputting a recorded product having an image corresponding to an electronic document formed thereon from the electronic document, an image processing device and method for generating an image signal which can be output to a display device, an image processing system and output device which employ the image processing device or image processing method, and a recording medium which can be read by a computer storing a program for causing the computer to execute these processing operations.

2. Description of the Related Art

In a DTP (Desktop Publishing) system, an image is generally formed and edited on a display device such as a CRT (Cathode Ray Tube) and a final document is output from an output device as a hard copy. Various devices have been developed as the display device and output device used, and not only one device but multiple devices are now in use. This device environment has such a problem that even when the same color image is to be output, colors vary according to the characteristic properties of a display device and an output device in use.

To control colors output from each device uniformly, CMS (Color Management System) has been introduced. Particularly, profile type color management established by ICC (International Color Consortium) has become standards in fact.

FIG. 28 is a diagram showing an example of conventional color management method proposed by ICC. In FIG. 28, reference numeral 101 denotes an electronic document, 102 color appearance model conversion unit, 103 device color correction unit, 104 to 107 display devices, 108 output conversion unit, 109 output device, 110 to 112 light sources, and 113 a recorded product. In the system, color management is carried out by converting into device independent color space. The device independent color space at this point is CIE1931XYZ chromaticity or CIE1976L*a*b* uniform color space.

As shown in FIG. 28, to display the electronic document 101 on the display devices 104 to 107, the color appearance model conversion unit 102 changes the color temperature of the electronic document 101 to a color temperature set or estimated by the display devices 104 to 107. As the color appearance model, for example, models proposed by von Kries, Hunt, Nayatani, Fairchild, Luo and the like are famous but CIECAM97s which makes use of the characteristic features of these models has recently been proposed.

Further, the device color correction unit 103 converts an image signal whose color temperature has been changed to a color temperature set or estimated by the display devices 104 to 107 by means of the color appearance model conversion unit 102 into color spaces specific to the display devices 104 to 107 using color conversion coefficients stored in a profile specified by ICC.

For instance, when a display device is of a general type which does not enable a user to control its color temperature, it generally has a color temperature of around 9300 K like the display device 107. The estimated color temperature of the electronic document 101 is D50 or D65 which is the color temperature of an ordinary light source in most cases. If the electronic document has a color temperature of D50, the color temperature of the electronic document 101 is changed from D50 to 9300 K by the color appearance conversion unit 102. Thereafter, the device color correction unit 103 converts the color temperature into color space specific to the display device 107 to be displayed on the display device 107.

The output device 109 forms an image on a recording medium to generate a recorded product on the assumption of D50 illumination in most cases. When the color temperature of the electronic document 101 is D50, it is converted into color space specific to the output device 109 by the output conversion unit 108. When the color temperature of the electronic document 101 is D65, the color appearance model conversion unit is provided to change it to D50 which is then converted into color space specific to the output device 109. Thus, the recorded product 113 having an image formed by the output device 109 is referred to by a user under light sources 10 to 112 having respective color temperatures. That is, the same recorded product 113 is referred to under the light sources 110 to 112.

This color management method has two big problems. One is that the colors of images output from respective devices completely differ from one another because the color temperature of each image depends on a color temperature set by a device such as any one of the display devices 104 to 107 or the output device 109. For example, when an image edited on the display device 107 which emits light at 9300 K is output to the output device 109 based on the assumption of D50 illumination to form an image and the image is compared with the image on the display device 107 under the light source 111 of D50, they look completely different in color. When the electronic document 101 is observed on the other display devices 104 to 106, the original color of the electronic document 101 may not be seen because the color temperature of the color document 101 depends on a color temperature set by each display device. These are inconvenient for users to form and edit an image. However, at an actual working site, these are considered as natural and left as they are.

The other problem is that the influence of environmental light is not taken into full consideration. For example, consider a case where an image formed on a recorded product and an image displayed on a display device are compared with each other at the same time under a light source having a color temperature of about 4000 K. In ICC's conventional method, the color temperature of the display device is set to 4000 K, the color appearance model conversion unit 102 is used to change the color temperature, the device color correction unit 103 converts device independent color space into color space specific to the display device using a color conversion coefficient corresponding to a color temperature of 4000 K, and the image is output.

The color appearance model can estimate color corresponding to a changed environment by grasping changes in the visual characteristics of a human being caused by a change in the color temperature of environmental light. However, it cannot estimate a color change caused by changes in the characteristic properties of a light source for observing a recorded product. For example, when a recorded product output on the assumption that it is observed under D50 illumination is observed under a light source having a color temperature of about 4000 K, a color difference is produced by changes in the characteristic properties of a light source. Particularly, in the case of xerography, this tendency is more conspicuous than photography. The color difference cannot be estimated with a color appearance model. This problem does not arise when the recorded product is observed under a specified light source. However, in an actual environment that a general user uses a DTP system, the observation light source is a fluorescent lamp (around 4000 K) which is generally used at offices in most cases although the output device has a set color temperature of D50. As described above, the color difference problem caused by changes in the characteristic properties of a light source cannot be solved by the conventional method.

Thus, the original appearance of the electronic document cannot be easily output from the display device and output device by the current color management method in most cases. When a recorded product is simulated on a display device, a simulation image does not agree with an image on the recorded product in terms of the appearance of color. Therefore, a user must adjust color to achieve his intended color, taking great time and labor to adjust color.

The present invention has been made in view of the above circumstances and provides an image processing device and image processing method which reproduce the original color of an electronic document faithfully on an output device for generating a recorded product having an image formed thereon or a display device for displaying an image, can simulate the appearance of color of a recorded product on a display device accurately and can simulate a second recorded product with a first recorded product. The present invention also provides an image processing system and an output device incorporating the image processing device or method and a recording medium which can be read by a computer storing a program for causing the computer to execute these processing operations.

SUMMARY OF THE INVENTION

The present invention is to convert an electronic document into an image signal for visualizing the electronic document and is characterized in that the color temperature information of the electronic document is recognized and that the electronic document is converted into an image signal for visualizing an image having substantially the same color as the electronic document based on the recognized color temperature information of the electronic document.

For example, as color conversion, first color conversion from an electronic document into an image signal which can be output to an output device for generating a recorded product can be made based on the recognized color temperature information of the electronic document to ensure that when a recorded product having an image corresponding to the electronic document formed thereon is observed under an illumination light source of a color temperature indicated by the color temperature information of the electronic document, it assumes substantially the same color as the electronic document. Thereby, a recorded product on which color described on the electronic document is faithfully reproduced can be obtained.

Further, as color conversion, second color conversion from an electronic document into an image signal which can be output to a display device can be made based on the recognized color temperature information of the electronic device to ensure that a display image can be displayed substantially the same color as the electronic document at a color temperature indicated by the color temperature information of the electronic document irrespective of the set color temperature of a light source for illuminating the display device for displaying the electronic document and therearound. Thereby, when the electronic document is displayed on the display device, color described on the electronic document can be reproduced faithfully.

Further, the color temperature information of an electronic document and the color temperature information of a light source for observing a recorded product corresponding to the electronic document are recognized, third color conversion from the electronic document into an image signal having substantially the same color as a recorded product under a light source for observing the recorded product corresponding to the electronic document is carried out based on the recognized color temperature information of the electronic document and the recognized color temperature information of the light source for observing the recorded product, and second color conversion from the image signal whose color has been changed by the third color conversion into an image signal which can be output to the display device can be made based on the recognized color temperature information of the light source for observing the recorded product to ensure that the recorded product can be displayed substantially the same color as the image signal whose color has been changed by the third color conversion irrespective of the set color temperature of the light source for illuminating the display device for displaying the electronic document and therearound. Thus, the appearance of color of the recorded product can be simulated on the display device accurately.

Further, the color temperature information of the electronic document and the color temperature information of a light source for observing a second recorded product corresponding to the electronic document are recognized, third color conversion from the electronic document into an image signal having substantially the same color as a second recorded product under a light source for observing the second recorded product corresponding to the electronic document is carried out based on the recognized color temperature information of the electronic document and the recognized color temperature information of the light source for observing the second recorded product, and first color conversion from an image signal whose color has been changed by the third color conversion into an image signal which can be output to the output device for generating the first recorded product can be made based on the recognized color temperature information of the light source for observing the second recorded product to ensure that when the first recorded product having different color reproducibility from the second recorded product is observed under a predetermined illumination light source, it assumes substantially the same color as the image signal whose color has been changed by the third color conversion. Thereby, the second recorded product can be simulated with the first recorded product.

BRIEF DESCRIPTION OF THE DRAWINGS

Preferred embodiments of the present invention will be described in detail based on the followings, wherein:

FIG. 12 is a diagram for explaining how to of create a color conversion coefficient for retaining color temperature information;

FIG. 13 is a block diagram of a third embodiment of the present invention;

FIGS. 21A and 21B are block diagrams showing other examples of the third color correction conversion unit and the first color correction conversion unit in the fourth embodiment of the present invention;

FIG. 25 is a diagram for explaining an example of user interface for switching the functions of an output device;

FIGS. 26A, 26B and 26C are diagrams for explaining examples of items in the example of user interface for switching the function of the output device;

DETAILED DESCRIPTION OF THE PREFERRED EMBODIMENTS

Figure 1:
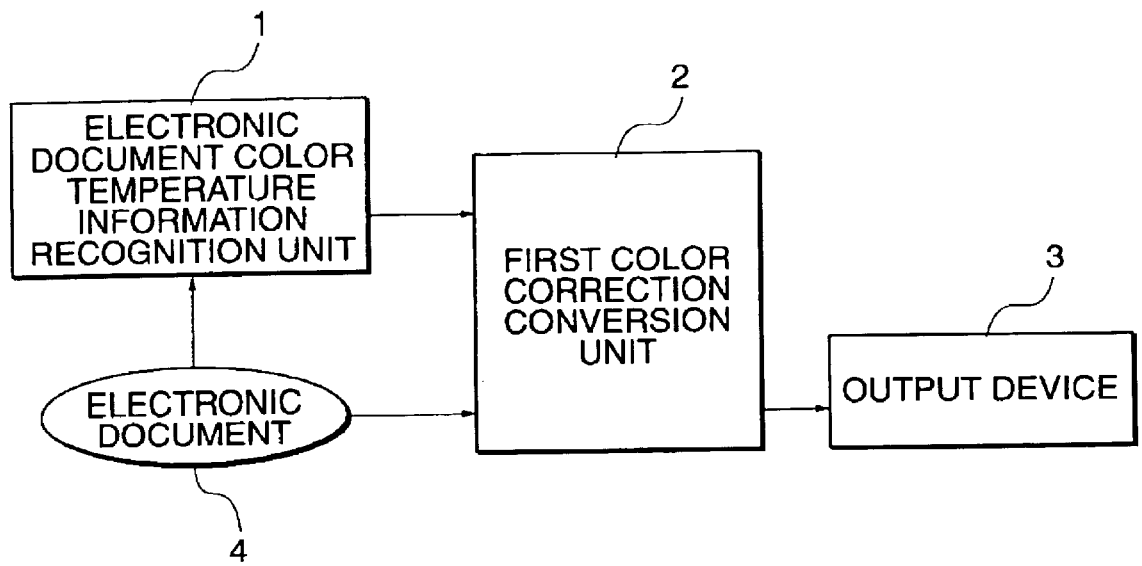
FIG. 1 is a block diagram of a first embodiment of the present invention.

FIG. 1 is a block diagram of a first embodiment of the present invention. In FIG. 1, reference numeral 1 denotes an electronic document color temperature information recognition unit, 2 first color correction conversion unit, 3 output device, and 4 electronic document. This first embodiment is for the faithful reproduction of the electronic document 4 at the color temperature of the electronic document 4.

The electronic document color temperature information recognition unit 1 recognizes the color temperature information of the electronic document 4 and transfers the recognized color temperature information of the electronic document 4 to the first color correction conversion unit 2. When the color temperature information is provided, for example, to the electronic document, the information is acquired. When it is not, a predetermined color temperature is set or selected from some set values. Alternatively, spectral distribution characteristics or three stimulus values of a light source, color temperature value or the name of a preset light source may be specified by a user. The recognized color temperature information may be, for example, three stimulus values. The color temperature information is not limited to this and may be the name of color temperature (D50, F8, etc.), CIE1931XYZ chromaticity or spectral characteristic data. When the color temperature information is a color signal of subtractive color mixture system such as three color (cyanide (C), magenta (M) and yellow (Y)) separation which is commonly used for printing, four color (the above three colors and black (K)) separation, or five or more color (CMYK and another color) separation, the information is recognized and a D50 light source may be automatically set. The D50 light source is a light source used as standard in the industry for printing an image on paper, typified by a printing business field.

The first color correction conversion unit 2 carries out color conversion from the electronic document 4 into an image signal which can be output to the output device 3 based on the color temperature information of the electronic document 4 recognized by the electronic document color temperature information recognition unit 1 to ensure that when a recorded product output from the output device 3 is observed under an illumination light source having a color temperature indicated by the color temperature information of the electronic document 4, it assumes substantially the same color as the electronic document 4.

The output device 3 generates a recorded product by forming an image on a recording medium according to a given image signal and outputs it. In this embodiment, an image corresponding to the electronic document 4 converted by the first color correction conversion unit 2 is formed on a recording medium and output as a recorded product.

The output device 3 may be existent in the same apparatus as the electronic document color temperature information recognition unit 1 and the first color correction conversion unit 2, or may be formed as a separate unit and connected to these units by a cable directly or through a network. When the output device 3 is a separate unit, the electronic document color temperature information recognition unit 1 and the first color correction conversion unit 2 can be mounted, for example, on a device driver. The electronic document color temperature information recognition unit 1 and the first color correction conversion unit 2 may use CMM (Color Matching Module) incorporated in OS to process an image, or may use an existing image processing module in the image processing unit of the output device 3. Further, a program which describes these methods may be stored in a storage medium.

Figure 2:
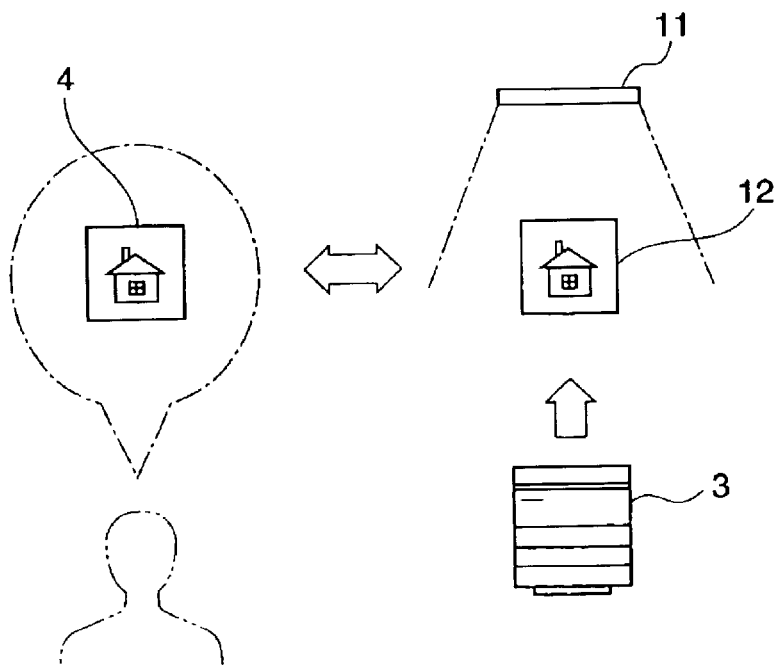
FIG. 2 is a schematic diagram for explaining the operation of the first embodiment of the present invention.

FIG. 2 is a schematic diagram for explaining the operation of the first embodiment of the present invention. In FIG. 2, reference numeral 11 denotes a light source and 12 a recorded product. The electronic document 4 prepared and edited by a user is prepared and edited on the assumption of a certain color temperature. Information on this color temperature is recognized by the electronic document color temperature information recognition unit 1 and transmitted to the first color correction conversion unit 2. The first color correction conversion unit 2 carries out color conversion based on the color temperature information of the electronic document 4 to ensure that when the recorded product output from the output device 3 is observed under an illumination light source having a color temperature indicated by the color temperature information of the electronic document 4, it assumes substantially the same color as the electronic document 4. The output device 3 forms an image on the recording medium based on the color converted image signal to generate a recorded product.

Color conversion is made on the recorded product 12 to ensure that the recorded product 12 assumes substantially the same color as the electronic document 4 at a color temperature estimated when the electronic document 4 is prepared and edited. Therefore, when the recorded product 12 is observed under a light source 11 having the same color temperature as the color temperature information of the electronic document 4, the image looks the same as the electronic document 4.

For example, when the electronic document 4 has a color temperature of D50, the first color correction conversion unit 2 carries out color conversion to ensure that color described on the electronic document 4 can be reproduced faithfully by the output device 3 and an image is output from the output device 3. When the output image is observed under the light source 11 of D50, the image having substantially the same color as the electronic document 4 can be observed. Similarly, when the electronic document 4 has a color temperature of D65, the first color correction conversion unit 2 carries out color conversion for D65 to ensure that an image output under the light source 11 of D65 can be observed substantially the same color as the electronic document 4.

Thus, an image on the recorded product 12 prepared by the output device 3 using the first embodiment of the present invention can be faithfully reproduced by the output device 3 at the color temperature of the electronic document 4 to ensure that when it is observed under the illumination light source 11 having a color temperature indicated by the color temperature information of the electronic document 4, it assumes substantially the same color as the electronic document 4.

Figure 3:
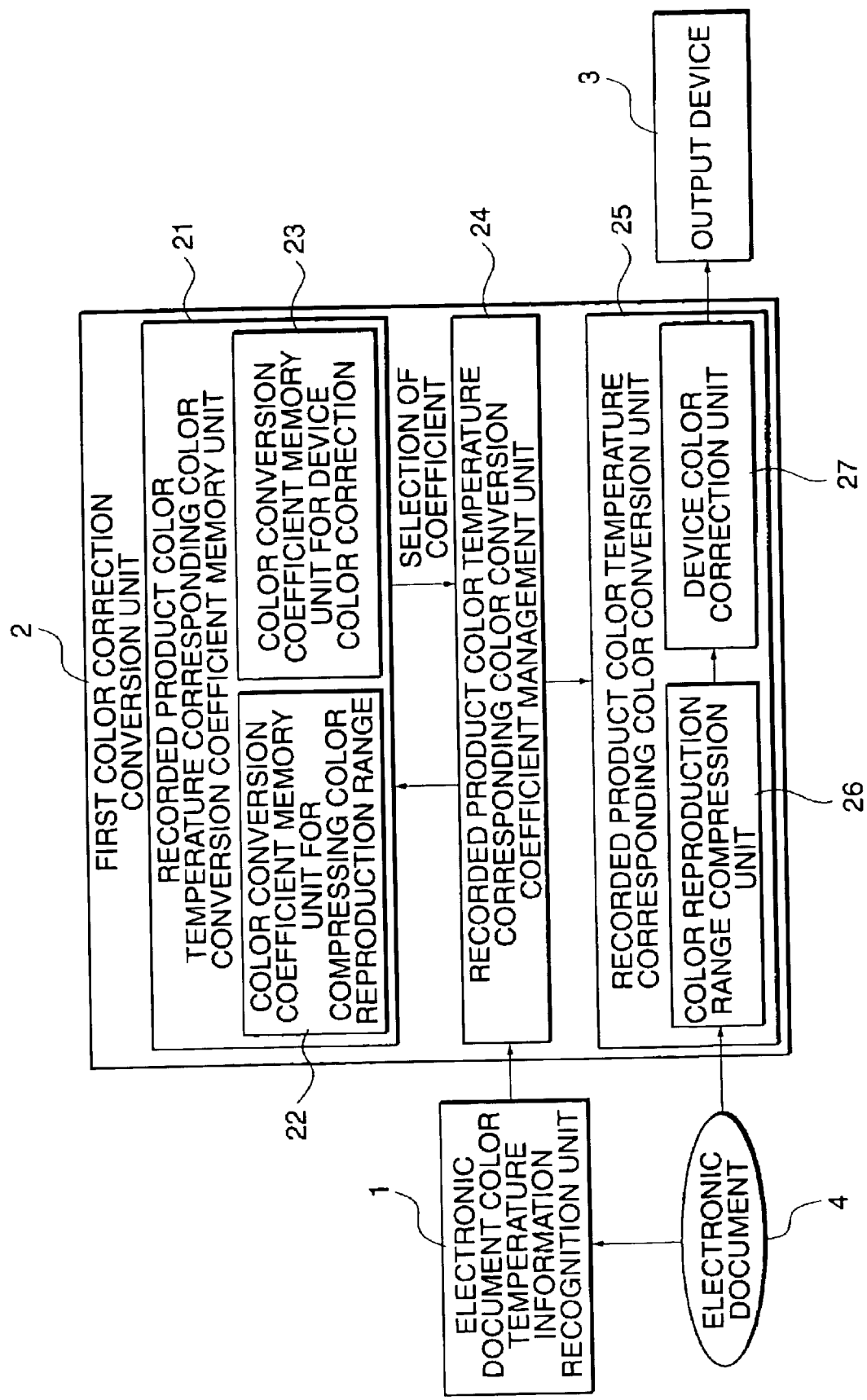
FIG. 3 is a block diagram showing an example of a first color correction conversion unit in the first embodiment of the present invention.

FIG. 3 is a block diagram showing an example of the first color correction conversion unit in the first embodiment of the present invention. In FIG. 3, reference numeral 21 is a recorded product color temperature corresponding color conversion coefficient memory unit, 22 color conversion coefficient memory unit for compressing color reproduction range, 23 conversion coefficient memory unit for device color correction, 24 recorded product color temperature corresponding color conversion coefficient management unit, 25 recorded product color temperature corresponding color conversion unit, 26 color reproduction range compression unit, and 27 device color correction unit. In this example, a color conversion coefficient used by the first color correction conversion unit 2 for color correction is selected according to the color temperature of the electronic document 4. Not shown, an image obtained by changing the color temperature of the electronic document to another color temperature using a color appearance model (from D65 to D50, for example) may be used as the electronic document 4.

The first color correction conversion unit 2 in FIG. 3 includes the recorded product color temperature corresponding color conversion coefficient memory unit 21, recorded product color temperature corresponding color conversion coefficient management unit 24 and recorded product color temperature corresponding color conversion unit 25.

The recorded product color temperature corresponding color conversion coefficient memory unit 21 stores one or more color conversion coefficients. In this example, the recorded product color temperature corresponding color conversion coefficient memory unit 21 includes the color conversion coefficient memory unit 22 for compressing color reproduction range and the color conversion coefficient memory unit 23 for device color correction. The color conversion coefficient memory unit 22 for compressing color reproduction range stores color conversion coefficients for compressing color reproduction range. The color conversion coefficients for compressing color reproduction range are used to remap an area which cannot be reproduced on the color reproduction range (color reproduction range) of the: recorded product to a reproducible range. For example, a method of compressing brightness as disclosed by Japanese Published Unexamined Patent Application No. Hei 10-210313 may be used. This method is to match white points (points where $L^*$ is the highest on the space) and black points (points where $L^*$ is the lowest on the space) on $CIEL^*a^*b^*$ color space with image data to be processed in the color reproduction range of an output device and to compress only $L^*$. Other color reproduction range compression methods have been proposed and any one of them may be used.

The color conversion coefficient memory unit 23 for device color correction stores device correction color conversion coefficients. The device correction color conversion coefficients are used to convert data on $CIEL^*a^*b^*$ color space calculated from the color temperature information of the electronic document 4 into device (output device 3) dependent color spaces C (cyanide), M (magenta), Y (yellow) and K (black). For example, a color conversion coefficient indicative of the relationship between $L^*a^*b^*$ and CMYK is obtained, for example, by a neutral network method disclosed by Japanese Published Unexamined Patent Application No. Hei No. 8-102865 and a statistical method disclosed by Japanese Published Unexamined Patent Application No. Hei No. 10-262157 as a printer model. The obtained color conversion coefficient can be stored in the recorded product color temperature corresponding color conversion coefficient memory unit 21 in the form of a 3-D LUT (Look-up Table).

Figure 4:
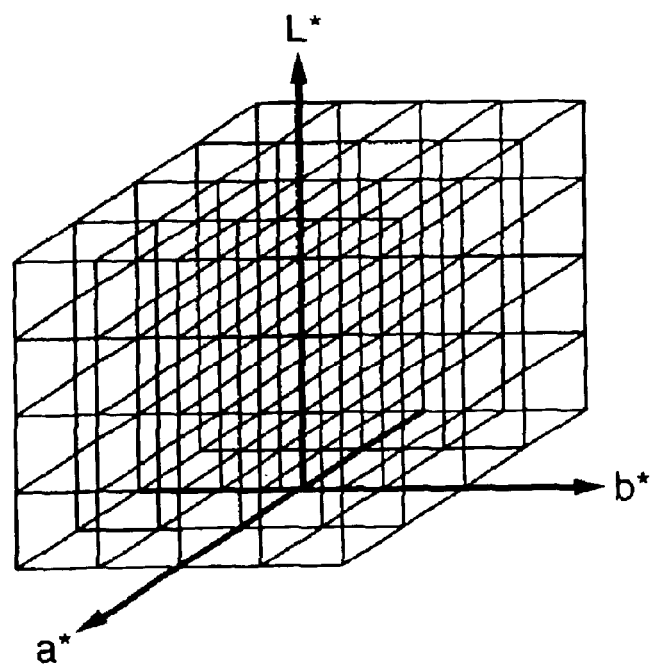
FIG. 4 is a diagram for explaining lattice points stored in a 3-D LUT.
Figure 5:
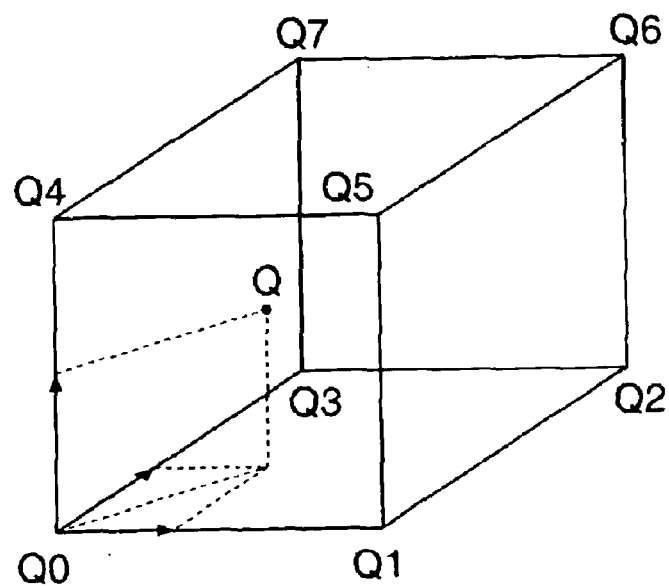
FIG. 5 is a diagram for explaining actual color conversion using the 3-D LUT.

FIG. 4 is a diagram for explaining lattice points to be stored in the 3-D LUT and FIG. 5 is a diagram for explaining color conversion using the 3-D LUT. The 3-D LUT to be stored in the recorded product color temperature corresponding color conversion coefficient memory unit 21 may store a value of image signal after conversion at a discrete lattice point in the color space as shown in FIG. 4. The address of the 3-D LUT is coordinates (position) on L*a*b* space and the value of image signal after conversion corresponding to the coordinates (position) is stored at the address. When the input image signal takes a coordinate value between lattice points as shown in FIG. 5, the image signal is considered as an internal dividing point for the lattice points and the value of image signal after conversion is determined by an interpolation method or the like. For example, as shown in FIG. 5, the load sum of the value of image signal at eight surrounding lattice points Q0 to Q7 can be obtained. That is, when the value of image signal after conversion is represented by D and the output values of the eight surrounding lattice points Q0 to Q7 are represented by Di (I=0 to 7), $$D=(1-\alpha)(1-\beta)(1-\gamma)D0+(1-\alpha)\beta(1-\gamma)D1+(1-\alpha)\beta\gamma D2+(1-\alpha)(1-\beta)\gamma D3+\alpha(1-\beta)(1-\gamma)D4+\alpha\beta(1-\gamma)D5+\alpha\beta\gamma D6+\alpha(1-\beta)\gamma D7 \quad (1)$$

$\alpha$, $\beta$ and y are each a value of 0 or more and 1 or less. This example uses 3-D interpolation but various methods such as tetrahedron interpolation and prism interpolation may be used.

Returning to FIG. 3, the recorded product color temperature corresponding color conversion coefficient management unit 24 selects a color conversion coefficient from plural color conversion coefficients stored in the color conversion coefficient memory unit 22 for compressing color reproduction range and the color conversion coefficient memory unit 23 for device color correction based on the color temperature information of the electronic document and delivers it to the recorded product color temperature corresponding color conversion unit 25. Alternatively, the unit 24 may create a new color conversion coefficient from the plural color conversion coefficients and deliver it to the recorded product color temperature corresponding color conversion unit 25.

The recorded product color temperature corresponding color conversion unit 25 uses the color conversion coefficient delivered from the recorded product color temperature corresponding color conversion coefficient management unit 24 to carry out color conversion from the electronic document 4 into an image signal which can be output from the output device 3. In this example, the recorded product color temperature corresponding color conversion unit 25 includes the color reproduction range compression unit 26 and the device color correction unit 27. The color reproduction range compression unit 26 and the device color correction unit 27 which have been supplied with respective color conversion coefficients carry out color conversion based on the color conversion coefficients to finally obtain an image signal which can be output and output it to the output device 3.

In this example, the recorded product color temperature corresponding color conversion unit 25 includes two conversion units. When the two color conversion coefficients stored in the recorded product color temperature corresponding color conversion coefficient memory unit 21 are 3-D LUTs, they may be combined into a single color conversion coefficient (3-D LUT) and the recorded product color temperature corresponding color conversion unit 25 may include a single color conversion unit. Thereby, an error at the time of color conversion generated by using the 3-D LUT multiple times can be suppressed and the processing speed can be increased.

Figure 6:
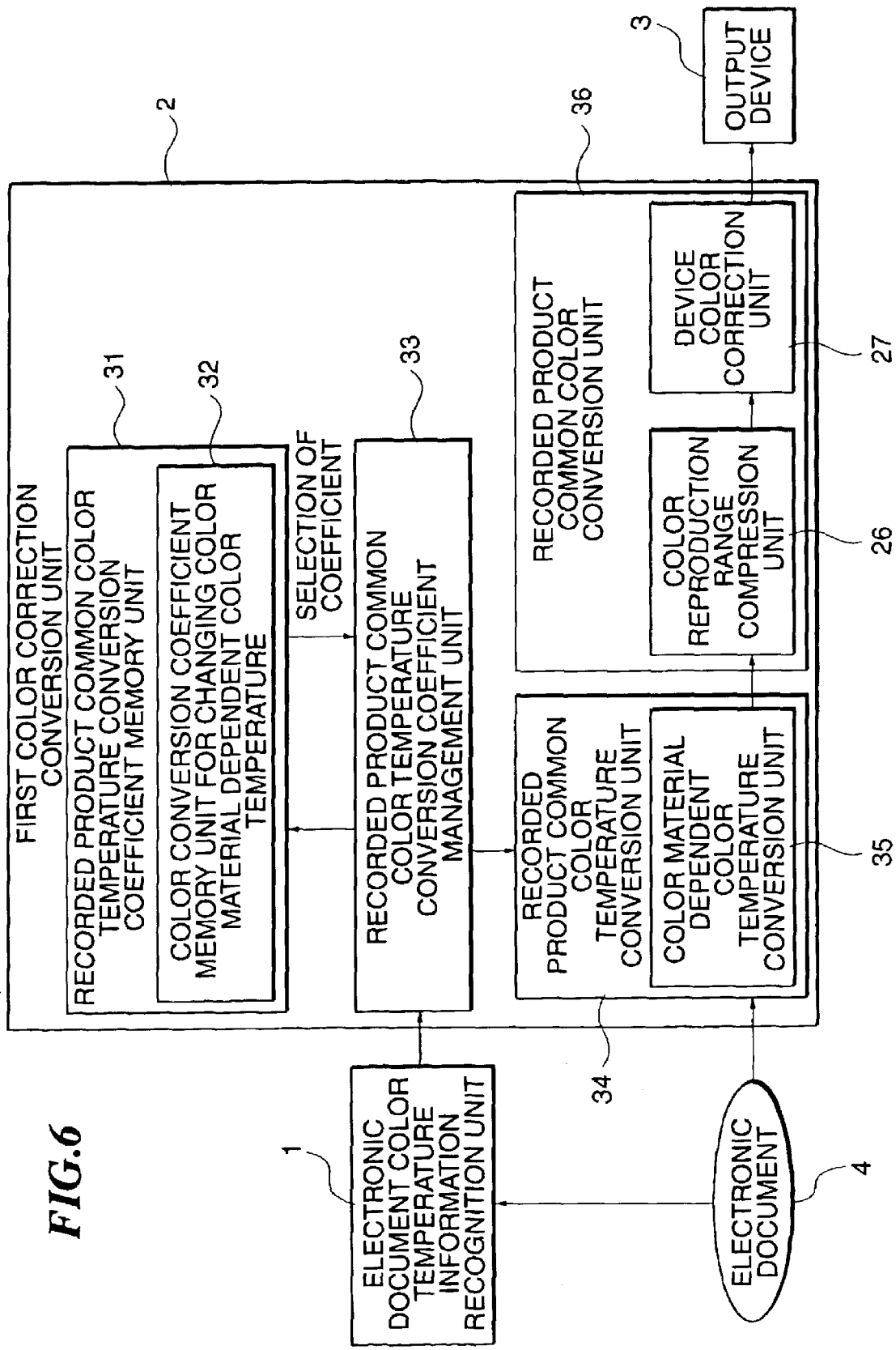
FIG. 6 is a block diagram showing another example of the first color correction conversion unit in the first embodiment of the present invention.

FIG. 6 is a block diagram showing another example of the first color correction conversion unit in the first embodiment of the present invention. In FIG. 6, the same and corresponding elements as those in FIG. 3 are given the same reference numerals and their descriptions are omitted. Reference numeral 31 is a recorded product common color temperature conversion coefficient memory unit, 32 color conversion coefficient memory unit for changing color material dependent color temperature, 33 recorded product common color temperature conversion coefficient management unit, 34 recorded product common color temperature conversion unit, 35 color material dependent color temperature conversion unit and 36 recorded product common color conversion unit.

Figures 7A, 7B, 7C:
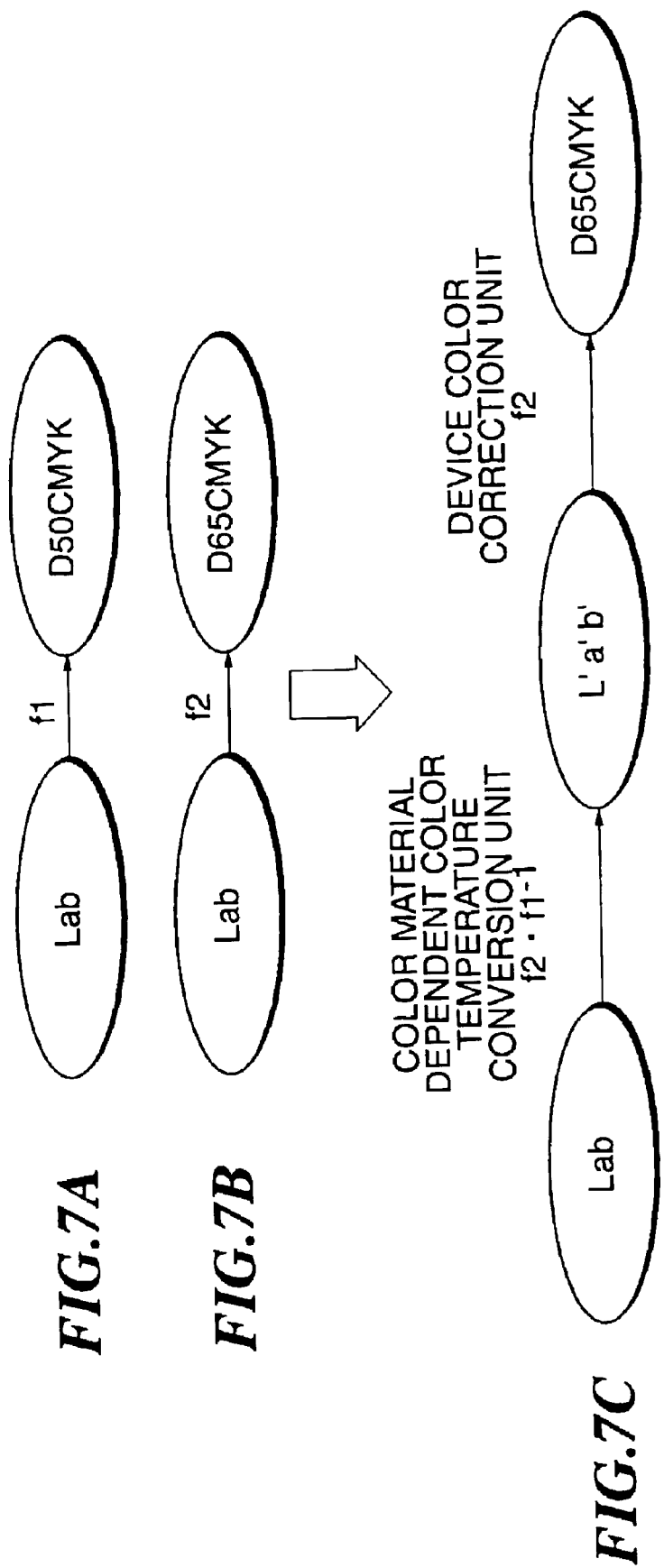
FIGS. 7A, 7B and 7C are diagrams for explaining a conversion process which is carried out by another example of the first color correction conversion unit in the first embodiment of the present invention.

In the example shown in FIG. 3, color conversion coefficients corresponding to respective color temperatures are stored. In this example, a difference in the color temperature of the electronic document 4 is absorbed by the color material dependent color temperature conversion unit 35 which will be described hereinafter and then only a predetermined color conversion coefficient (for example, color conversion coefficient for D50) is used for other color temperatures. FIGS. 7A, 7B and 7C are diagrams for explaining a conversion process which is carried out by another example of the first color correction conversion unit in the first embodiment of the present intention. Color conversion from L*a*b* data on a certain color temperature into D50 is represented by f1 as shown in FIG. 7A and color conversion from L*a*b* data on a certain color temperature into D65 is represented by f2 as shown in FIG. 7B. When the common color conversion is f1, to obtain an image signal of D65, as shown in FIG. 7C, the color material dependent color temperature conversion unit 35 carries out color conversion f2 into D65 and inversion of color conversion f1 into D50. Thereafter, the device color correction unit 27 carries out common color conversion f1, whereby color conversion f2 is carried out as a whole and an image signal having a color temperature of D65 can be obtained. The difference of color temperature caused by the color reproduction range compression processing of the color reproduction range compression unit 26 is so small that it is negligible.

In the example shown in FIG. 6, the first color correction conversion unit 2 includes the recorded product common color temperature conversion coefficient memory unit 31, recorded product common color temperature conversion coefficient management unit 3, recorded product common color temperature conversion unit 34 and recorded product common color conversion unit 36. Not shown, an image obtained by changing the color temperature of the electronic document to another color temperature using a color appearance model (for example, from D65 to D50) may be used as the electronic document 4.

The recorded product common color temperature conversion coefficient memory unit 31 stores one or more color conversion coefficients and includes the color conversion coefficient memory unit 32 for changing color material dependent color temperature. The color conversion coefficient memory unit 32 for changing color material dependent color temperature stores color conversion coefficients for changing color material dependent color temperature. The color conversion coefficients for changing color material dependent color temperature are used to carry out color conversion on the electronic document 4 having a color temperature other than a specified color temperature so that a subsequent processing system can be used. For example, only a color conversion coefficient for D50 is prepared for the subsequent color conversion process and used to carry out preprocessing for proper color conversion using the subsequent processing system directly when the electronic document having a color temperature of D65 is input. As previously explained with reference to FIGS. 7A, 7B and 7C, a conversion coefficient used to execute a composite function for the inversion of color conversion f1 which is commonly carried out and for color conversion f2 on the electronic document 4 may be stored. This conversion coefficient is required for each color material and corresponding color temperature because it differs according to a change in color temperature for each color material. However, the memory capacity is smaller than when color conversion coefficients for all the steps are prepared. A 3-D LUT which stores this conversion coefficient may be stored.

The recorded product common color temperature conversion coefficient management unit 33 selects a color conversion coefficient from plural color conversion coefficients stored in the color conversion coefficient memory unit 32 for changing color material dependent color temperature based on the color temperature information of the electronic document 4 recognized by the electronic document color temperature information recognition unit 1, or creates a new color conversion coefficient from the plural color conversion coefficients and delivers it to the recorded product common color temperature conversion unit 34.

The recorded product common color temperature conversion unit 34 carries out color conversion from the electronic document 4 into an image signal having a common color temperature according to the color conversion coefficient delivered from the recorded product common color temperature conversion coefficient management unit 33. In this example, the recorded product common color temperature conversion unit 34 has the color material dependent color temperature conversion unit 35. The color material dependent color temperature conversion unit 35 carries out color conversion on the electronic document 4 according to a color conversion coefficient delivered from the recorded product common color temperature conversion coefficient management unit 33 and delivers the processing result to the recorded product common color conversion unit 36.

The recorded product common color conversion unit 36 carries out color conversion from an image signal whose color has been changed by the recorded product common color temperature conversion unit 34 into an image signal which can be output from the output device 3 in the end using a color conversion coefficient corresponding to a targeted common color temperature when color conversion is carried out by the recorded product common color temperature conversion unit 34 (color material dependent color temperature conversion unit 35) and outputs it to the output device 3. In this example, the recorded product common color conversion unit 36 includes the color reproduction range compression unit 26 and the device color correction unit 27. The color reproduction range compression unit 26 remaps an image signal which cannot be reproduced by the output device 3 to a reproducible image signal. The device color correction unit 27 converts data on CIEL*a*b* color space calculated from the color temperature information of the electronic document 4 into device (output device 3 in this example) dependent color spaces R (red), G (green) and B (blue). The color reproduction range compression unit 26 and the device color correction unit 27 are basically the same as those shown in FIG. 3 but differ in that a common conversion coefficient is used.

According to this constitution, an image corresponding to the electronic document 4 is recorded on the recording medium by the output device 3 so that it assumes substantially the same color as the electronic document 4 when it is observed under an illumination light source of a color temperature indicated by the color temperature information of the electronic document 4, thereby producing a recorded product. Since a common conversion coefficient is used by the color reproduction range compression unit 26 and the device color correction unit 27 in this example, it is not necessary to prepare conversion coefficients to be used by these units, thereby making it possible to reduce storage capacity. Existing units may be used as the color reproduction range compression unit 26 and the device color correction unit 27, thereby making it easy to construct these units.

Figure 8:
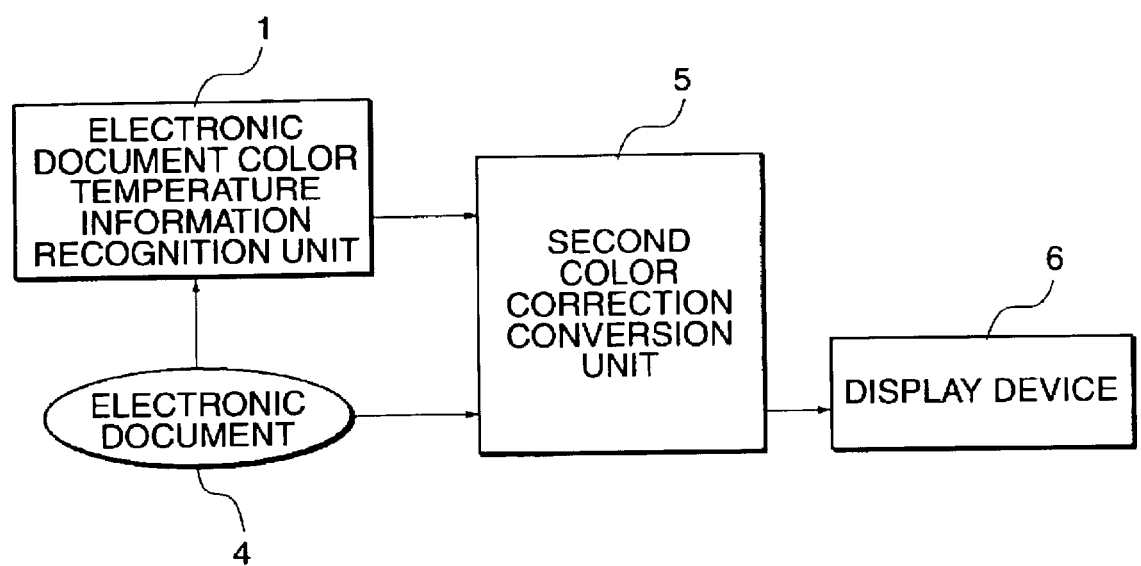
FIG. 8 is a block diagram of a second embodiment of the present invention.

FIG. 8 is a block diagram of a second embodiment of the present invention. In FIG. 8, the same and corresponding elements as those in FIG. 1 are given the same reference numerals. Reference numeral 5 denotes a second color correction conversion unit and 6 a display device. This second embodiment is to display an image of the electronic document on the display device faithfully.

The electronic document color temperature information recognition unit 1 recognizes the color temperature information of the electronic document 4 and delivers the recognized color temperature information of the electronic document 4 to the second color correction conversion unit 5 like the first embodiment. The color temperature information may be acquired when it is provided to the electronic document. When it is not provided to the electronic document, a predetermined color temperature is set, or an appropriate value is selected from some set values. Alternatively, spectral distribution characteristics or three stimulus values of a light source, color temperature value or the name of a preset light source may be specified by a user. The recognized color temperature information may be, for example, three stimulus values. The color temperature information is not limited to this and may be the name of color temperature (D50, F8, etc.), CIE1931XYZ chromaticity or spectral characteristic data. When the color temperature information is a signal of red (R), green (G) and blue B RGB additive color mixture system typified by a digital camera, the information is recognized and a D65 light source specified by sRGB may be automatically set.

The second color correction conversion unit 5 carries out color conversion from the electronic document 4 into an image signal which can be output to the display device 6 based on the color temperature information of the electronic document 4 recognized by the electronic document color temperature information recognition unit 1 to ensure that a display image is displayed substantially the same color as the electronic document at a color temperature indicated by the color temperature information of the electronic document 4 irrespective of the set color temperature of the light source for illuminating the display device 6 and therearound.

The display device 6 may be existent in the same apparatus as the electronic document color temperature information recognition unit 1 and the second color correction conversion unit 5 or may be a separate unit which is connected to the above units by a cable directly or through a network. When the display device 6 is a separate unit, the electronic document color temperature information recognition unit 1 and the second color correction conversion unit 5 may be mounted on a device driver, for example. The electronic document color temperature information recognition unit 1 and the second color correction conversion unit 5 may use CMM (Color Matching Module) incorporated in OS to process an image, or may use an existing image processing module in the image processing unit of the output device 6. Further, a program which describes these methods may be stored in a storage medium.

Figure 9A:
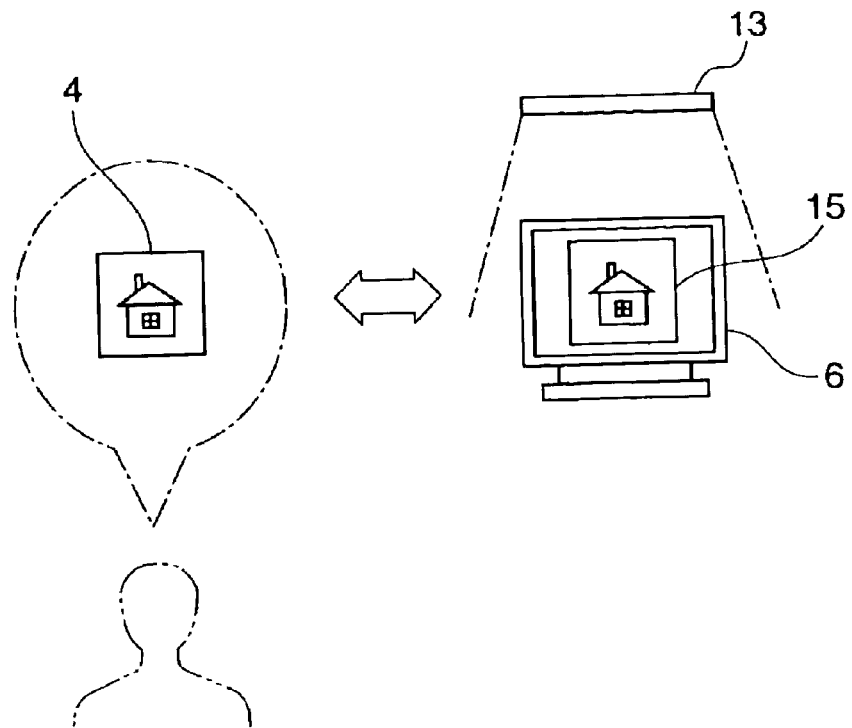
FIGS. 9A and 9B are schematic diagrams for explaining the operation of the second embodiment of the present invention.
Figure 9B:
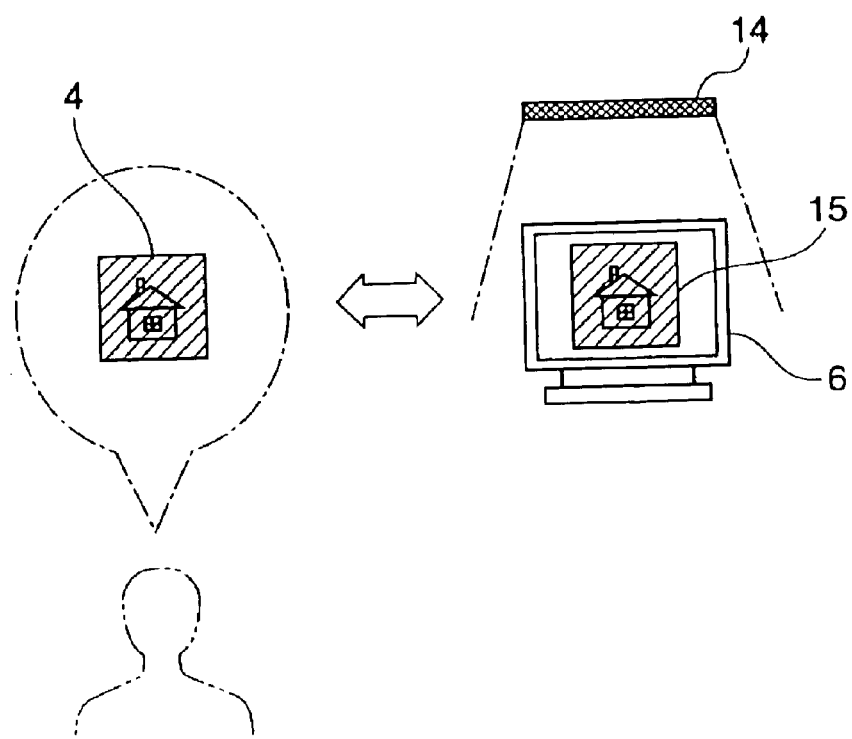

FIGS. 9A and 9B are schematic diagrams for explaining the operation of the second embodiment of the present invention. In FIGS. 9A and 9B, reference numerals 13 and 14 are light sources, and 15 an display image. The electronic document 4 prepared and edited by a user is prepared and edited on the assumption of a certain color temperature. Information on this color temperature is recognized by the electronic document color temperature information recognition unit 1 and transmitted to the second color correction conversion unit 5. The second color correction conversion unit 5 carries out color conversion from the electronic document 4 into an image signal which can be output to the display device 6 based on the color temperature information of the electronic document 4 to ensure that the image signal is displayed substantially the same color as the electronic document 4 at a color temperature indicated by the color temperature information of the electronic document 4 irrespective of the set color temperature of the light source for illuminating the display device 6 and therearound. The color converted image signal is input into the display device 6 to be displayed on the display screen.

Even when the same image signal is provided to the display device 6, the color of the displayed image differs according to the color temperature of a light source for illuminating the display device 6 and the display screen of the display device 6. In the present invention, color conversion is carried out to ensure that the image is displayed substantially the same color as the electronic document 4 irrespective of the color temperatures of the light sources 13 and 14 for illuminating the display device 6 and the display screen of the display device 6. Therefore, the image can be displayed on the display device 6 so that it looks substantially the same color as the electronic document 4.

For example, when the electronic document 4 has a color temperature of D50 (5000 K), color conversion is carried out to ensure that the original color of the electronic document 4 can be reproduced on the display screen of the display device 6 faithfully and an output image is displayed and observed by setting the color temperature of the display device 6 to D50. When the color temperature of the light source 13 shown in FIG. 9A is D50 at this point, the color of the electronic document 4 is reproduced on the display screen of the display device 6 faithfully.

When the color temperature of the light source 14 is not D50 as shown in FIG. 9B (for example, color temperature of 4000 K, 6500 K (D65), etc.), the color of the same display image 15 as in FIG. 9A looks different. Therefore, it is possible to make the display image 15 look the same by correcting color temperature surrounding the display device 6.

Thus, the image displayed on the display device 6 by using the second embodiment of the present invention can be displayed as an image having the appearance of a color temperature indicated by the color temperature information of the electronic document 4 irrespective of the color temperatures of the display device 6 and the light sources 13 and 14 for illuminating the display device 6.

Figure 10:
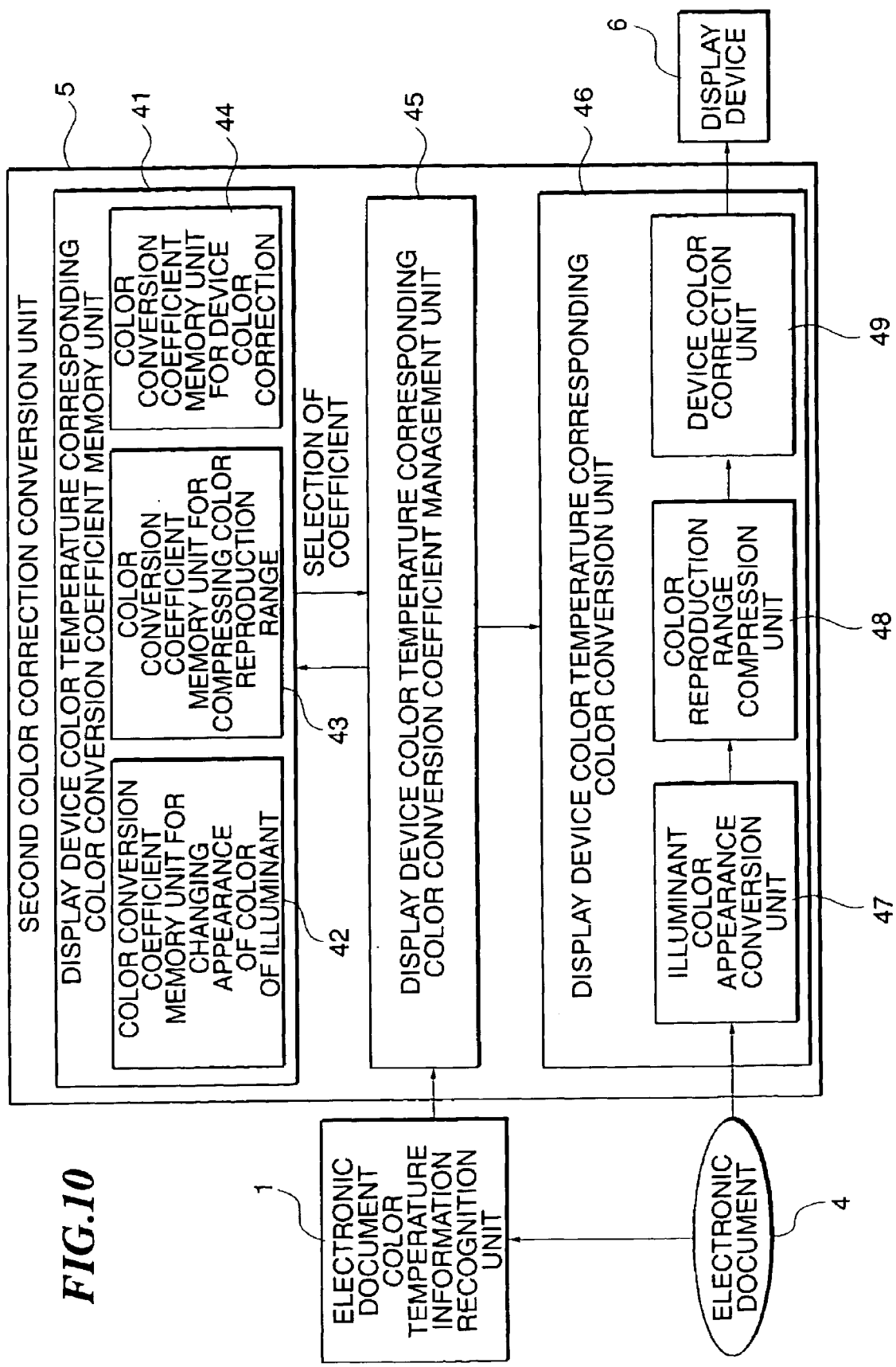
FIG. 10 is a block diagram showing an example of a second color correction conversion unit in the second embodiment of the present invention.

FIG. 10 is a block diagram showing an example of the second color correction conversion unit in the second embodiment of the present invention. In FIG. 10, reference numeral 41 denotes a display device color temperature corresponding color conversion coefficient memory unit, 42 color conversion coefficient memory unit for changing the appearance of color of an illuminant, 43 color conversion coefficient memory unit for compressing color reproduction range, 44 conversion coefficient memory unit for device color correction, 45 display device color temperature corresponding color conversion coefficient management unit, 46 display device color temperature corresponding color conversion unit, 47 illuminant color appearance conversion unit, 48 color reproduction range compression unit, and 49 device color correction unit. Not shown, an image obtained by changing the color temperature of the electronic document to another color temperature using a color appearance model (for example, from D65 to D50) may be used as the electronic document 4.

The second color correction conversion unit 5 includes the display device color temperature corresponding color conversion coefficient memory unit 41, display device color temperature corresponding color conversion coefficient management unit 45 and display device color temperature corresponding color conversion unit 46. The display device color temperature corresponding color conversion coefficient memory unit 41 stores one or more color conversion coefficients. In this example, the display device color temperature corresponding color conversion coefficient memory unit 41 includes the color conversion coefficient memory unit 42 for changing the appearance of color of an illuminant, color conversion coefficient memory unit 43 for compressing color reproduction range and conversion coefficient memory unit 44 for device color correction.

The color conversion coefficient memory unit 42 for changing the appearance of color of an illuminant stores color conversion coefficients for changing the appearance of color of an illuminant. The color conversion coefficients for changing the appearance of color of an illuminant are used to correct a difference in the appearance of color between the display device including the illuminant and the recorded product referred to by the reflection of light. The display device and the recorded product appear almost the same in color by adjusting chromaticity under the light source of D50 or the light source of D65 and there is no marked difference between them. However, under a light source having a color temperature of around 4000 K which is used at offices in general, the display device and the recorded product look much different in color even by adjusting chromaticity. To absorb the difference of appearance of color between the display device and the recorded product, color conversion coefficients may be determined, for example, by conducting color matching experiments and obtaining measurement values and color matching values of multiple colors obtained. The color conversion coefficients may be in the form of a 3×3 matrix or 3-D LUT. As disclosed by Japanese Published Unexamined Patent Application No. Hei 10-65930, color conversion coefficients may be determined by conducting color matching experiments on white color alone and estimating using a color appearance model (vonKries, etc.) for other colors.

The color conversion coefficient memory unit 43 for compressing color reproduction range is the same as the color conversion coefficient memory unit 22 for compressing color reproduction range in the first embodiment of the present invention and stores color conversion coefficients for compressing color reproduction range. The color conversion coefficients for compressing color reproduction range are used to remap the value of an image signal which cannot be reproduced in the color reproduction range to a reproducible range because the actual color reproduction range (color reproduction area) of the display device 6 is shrunk by the reflection of environmental light around the display device 6 upon the display screen of the display device 6. The compression method itself is the same as in the above first embodiment. Various color reproduction range compression methods have been proposed in addition to this. In this example, any one of these methods may be used.

The conversion coefficient memory unit 44 for device color correction is the same as the color conversion coefficient memory unit 23 for device color correction in the above first embodiment and stores device correction color conversion coefficients. The device correction color conversion coefficients are used to convert data on CIEL*a*b* color space calculated from the color temperature information of the electronic document into device (display device 6 in this example) dependent R (red), G (green) and B (blue) color spaces. The color conversion coefficients may be in the form of a 3×3 matrix or TRC when accuracy is sufficient or 3-D LUT or the like when accuracy is insufficient.

The display device color temperature corresponding color conversion coefficient management unit 45 selects a color conversion coefficient from plural color conversion coefficients stored in the color conversion coefficient memory unit 42 for changing the appearance of color of an illuminant, the color conversion coefficient memory unit 43 for compressing color reproduction range and the conversion coefficient memory unit 44 for device color correction and delivers it to the display device color temperature corresponding color conversion unit 46. Alternatively, a color conversion coefficient may be created from the plural cover conversion coefficients and delivered to the display device color temperature corresponding color conversion unit 46.

The display device color temperature corresponding color conversion unit 46 carries out color conversion from the electronic document 4 into an image signal which can be output to the display device 6 using the color conversion coefficient delivered from the display device color temperature corresponding color conversion coefficient management unit 45. In this example, the display device color temperature corresponding color conversion unit 46 includes the illuminant color appearance conversion unit 47, color reproduction range compression unit 48 and device color correction unit 49. The illuminant color appearance conversion unit 47, color reproduction range compression unit 48 and device color correction unit 49 which have been supplied with respective color conversion coefficients carry out color conversion based on the color conversion coefficients to finally obtain a signal which can be output and output it to the display device 6.

The display device color temperature corresponding color conversion unit 46 includes three conversion units. When three color conversion coefficients in the display device color temperature corresponding color conversion coefficient memory unit 41 are 3-D LUTs, they may be combined together into one or two color conversion coefficients so that the display device color temperature corresponding color conversion unit 46 includes one or two color conversion units. Thereby, an error at the time of color conversion generated by using the 3-D LUT multiple times can be suppressed and the processing speed can be improved.

Figure 11:
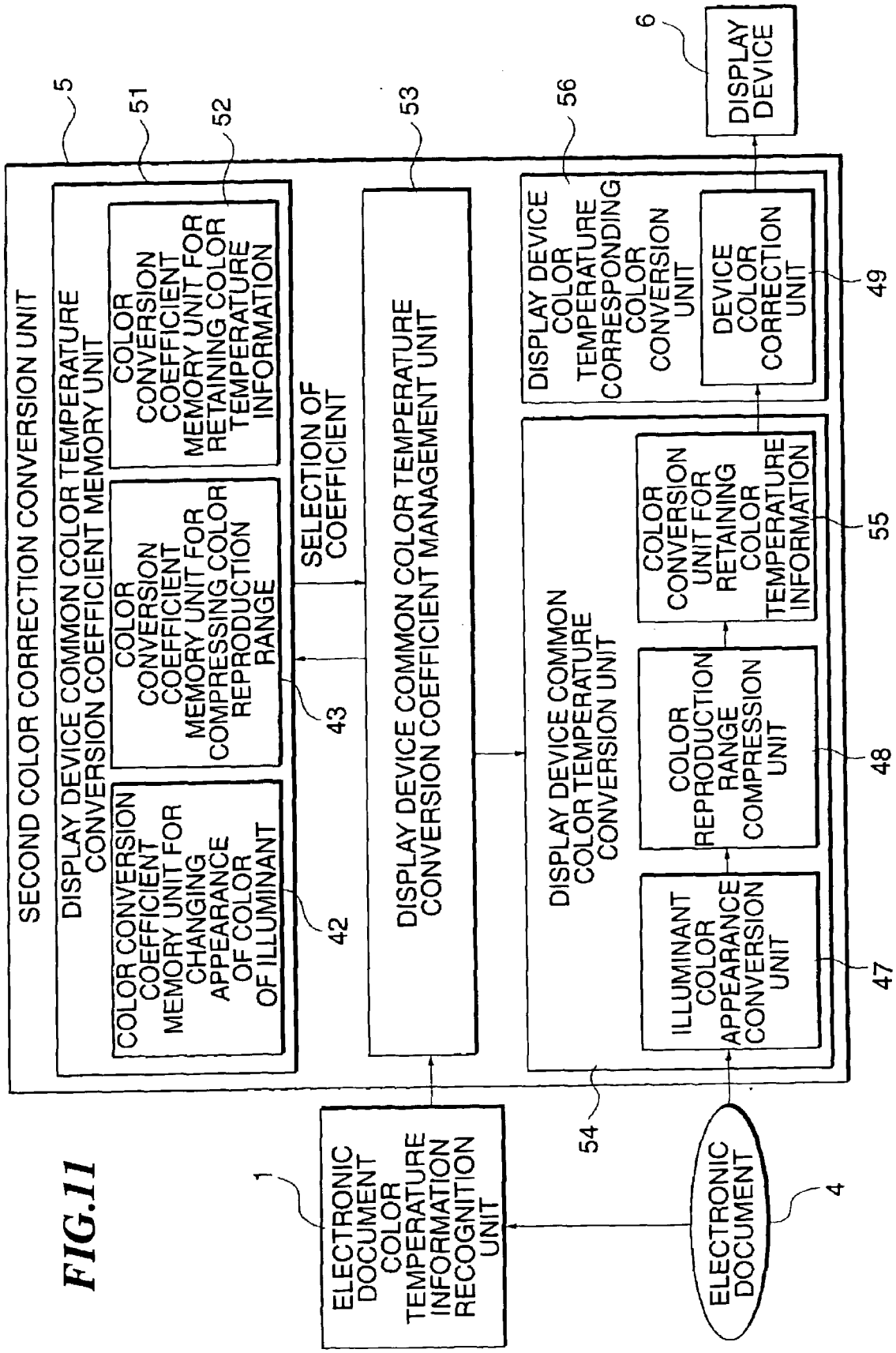
FIG. 11 is a block diagram showing another example of the second color correction conversion unit in the second embodiment of the present invention.

FIG. 11 is a block diagram showing another example of the second color correction conversion unit in the second embodiment of the present invention. In FIG. 11, the same or corresponding elements as those in FIG. 10 are given the same reference numerals and their descriptions are omitted. Reference numeral 51 denotes a display device common color temperature conversion coefficient memory unit, 52 color conversion coefficient memory unit for retaining color temperature information, 53 display device common color temperature conversion coefficient management unit, 54 display device common color temperature conversion unit, 55 color conversion unit for retaining color temperature information, and 56 display device common color conversion unit. In this example, like the example shown in FIG. 10, color conversion is carried out as indicated by the color temperature of the electronic document to display faithfully.

What differs from the example shown in FIG. 10 is that the display device common color temperature conversion unit 54 absorbs a difference in the color temperature of the electronic document and the device color correction unit 49 uses a specific color conversion coefficient for color conversion. Also in this example, an image obtained by changing the color temperature of the electronic document to another color temperature using a color appearance model (for example, from D65 to D50) may be used as the electronic document 4.

In this example, the second color correction conversion unit 5 includes the display device common color temperature conversion coefficient memory unit 51, display device common color temperature conversion coefficient management unit 53, display device common color temperature conversion unit 54 and display device common color conversion unit 56. The display device common color temperature conversion coefficient memory unit 51 includes a color conversion coefficient memory unit 42 for changing the appearance of color of an illuminant, color conversion coefficient memory unit 43 for compressing color reproduction range and color conversion coefficient memory unit 52 for retaining color temperature information.

The color conversion coefficient memory unit 42 for changing the appearance of color of an illuminant stores color conversion coefficients for changing the appearance of color of an illuminant. The color conversion coefficients for changing the appearance of color of an illuminant are used to correct a difference in the appearance of color between the display device and the recorded product. It is basically the same as the example shown in FIG. 10. The color conversion coefficient memory unit 43 for compressing color reproduction range stores color conversion coefficients for compressing color reproduction range. The color conversion coefficients for compressing color reproduction range are used to remap the value of an image signal which cannot be reproduced in the color reproduction range to a reproducible range because the actual color reproduction range (color reproduction area) of the display device 6 is shrunk by the reflection of environmental light around the display device 6 upon the display screen of the display device 6. It is basically the same as the example shown in FIG. 10.

The color conversion coefficient memory unit 52 for retaining color temperature information stores color conversion coefficients for retaining color temperature information. The color conversion coefficients for retaining color temperature information are used to absorb the difference of chromaticity when the color temperature of the electronic document 4 changes by changing chromaticity corresponding to the color temperature of the electronic document 4 to chromaticity under an observation light source used by the device color correction unit 49. FIG. 12 is a diagram for explaining how to create a color conversion coefficient for retaining color temperature information. When color temperature in the device color correction unit 49 is D50, for example, and the color temperature of the electronic document 4 is D65, an image signal (Lab in the figure) in L*a*b* uniform color space is converted into XYZ chromaticity (XYZ in the figure) to change color temperature from D65 to D50 and then into L*a*b* uniform color space (L'a'b' in the figure). In this process, the input image signal in the L*a*b* uniform color space of D65 is made an address and the value of the converted image signal in the L*a*b* uniform color space of D50 is stored at the address to create a 3-D LUT.

The display device common color temperature conversion coefficient management unit 53 selects a color conversion coefficient from plural color conversion coefficients stored in the color conversion coefficient memory unit 42 for changing the appearance of color of an illuminant, the color conversion coefficient memory unit 43 for compressing color reproduction range and the color conversion coefficient memory unit 52 for retaining color temperature information based on the color temperature information of the electronic document and delivers it to the display device common color temperature conversion unit 54. Alternatively, a new color conversion coefficient may be created from the plural color conversion coefficients and delivered to the display device common color temperature conversion unit 54.

The display device common color temperature conversion unit 54 uses the color conversion coefficient delivered from the display device common color temperature conversion coefficient management unit 53 to convert the color temperature of the electronic document 4 into an image signal having a common color temperature. In this example, the display device common color temperature conversion unit 54 includes an illuminant color appearance conversion unit 47, color reproduction range compression unit 48 and color conversion unit 55 for retaining color temperature information. Color conversion is made on the electronic document 4 by the illuminant color appearance conversion unit 47, color reproduction range compression unit 48 and color conversion unit 55 for retaining color temperature information all of which have been delivered respective color conversion coefficients and the processing results is delivered to the display device common color conversion unit 56.

The color conversion unit 55 for retaining color temperature information uses a color temperature information retaining color conversion coefficient stored in the color conversion coefficient memory unit 52 for retaining color temperature information to convert chromaticity corresponding to the color temperature of the electronic document 4 into a substantially equivalent color under an observation light source used by the device color correction unit 49 as explained with reference to FIG. 12. Thereby, the difference of chromaticity is absorbed when the color temperature of the electronic document 4 changes.

It is conceivable that the color reproduction range compression unit 48 is shared like the example of the first embodiment shown in FIG. 6. However, since the color reproduction range greatly changes according to color temperature when the image is output to the display device 6 unlike the output device 3, the color reproduction range compression unit 48 is not shared in this example. However, if the change of color reproduction range according to color temperature is negligible, the processing of the color reproduction range compression unit 48 can be shared.

The display device common color conversion unit 56 carries out color conversion from an image signal which has been converted by the display device common color temperature conversion unit 54 into an image signal which can be output to the display device 6. In this example, the display device common color conversion unit 56 has a device color correction unit 49. The device color correction unit 49 carries out color conversion using a predetermined color conversion coefficient to finally obtain a signal which can be output and outputs it to the display device 6. This color conversion coefficient used by the device color correction unit 49 may be stored in the display device common color temperature conversion coefficient memory unit 51.

Owing to this constitution, the color of the electronic document 4 can be reproduced on the display screen of the display device 6 faithfully irrespective of the color temperatures of the display device 6 and a light source for illuminating the display device 6. Since the device color correction unit 49 is shared in this example, it is not necessary to prepare a conversion coefficient to be used by this device color correction unit 49, thereby making it possible to reduce storage capacity. Existing processing units can be used for the processing operations of the display device common color temperature conversion unit 54 and the display device common color conversion unit 56 by changing conversion coefficients, for example, thereby making it possible to construct these units with ease.

FIG. 13 is a block diagram of a third embodiment of the present invention. In FIG. 13, the same or corresponding elements as those in FIG. 1 and FIG. 8 are given the same reference numerals. Reference numeral 7 denotes a recorded product observation light source color temperature information recognition unit, and 8 third color correction conversion unit. In the above second embodiment, the electronic document is reproduced on the display device at its color temperature faithfully. In contrast to this, this third embodiment shows an example that the same appearance of color as when the recorded product is observed is simulated on the display screen.

The electronic document color temperature information recognition unit 1 recognizes the color temperature information of the electronic document 4 and delivers the recognized color temperature information of the electronic document 4 to the third color correction conversion unit 8 like the first and second embodiments. The color temperature information may be acquired when it is provided to the electronic document. When it is not, a predetermined color temperature is set or selected from some set values. Alternatively, spectral distribution characteristics or three stimulus values of a light source, color temperature value or the name of a preset light source may be specified by a user. The recognized color temperature information may be, for example, three stimulus values. The color temperature information is not limited to this and may be the name of color temperature (D50, F8, etc.), CIE1931XYZ chromaticity or spectral characteristic data. When the color temperature information is a signal of red (R), green (G) and blue (B) RGB additive color mixture system typified by a digital camera, the information is recognized and a D65 light source specified by sRGB may be automatically set.

The recorded product observation light source color temperature information recognition unit 7 recognizes color temperature information on the predetermined color of the recorded product under an observation light source with measurement data obtained by a measuring instrument or user specified value and deliveries it to the third color correction conversion unit 8 and the second color correction conversion unit 5. The measurement data obtained by the measuring instrument may be the spectral distribution characteristics of the light source, the spectral distribution characteristics of the recorded product illuminated with the light source, the three stimulus values of the light source or the three stimulus values of the recorded product illuminated with the light source. The value specified by the user may be the spectral distribution characteristics of the light source, the three stimulus values of the light source, the name of a preset light source, or the value of color temperature.

The third color correction conversion unit 8 carries out color conversion from the electronic document 4 into an image signal having substantially the same color as a recorded product under a light source for observing the recorded product corresponding to the electronic document 4 based on the color temperature information of the electronic document recognized by the electronic document color temperature information recognition unit 1 and the color temperature information of the light source for observing the recorded product recognized by the recorded product observation light source color temperature information recognition unit 7.

The second color correction conversion unit 5 is the same as that of the above second embodiment but receives the color temperature information of the light source for observing the recorded product recognized by the recorded product observation light source color temperature information recognition unit 7 in this third embodiment. Based on this color temperature information, the second color correction conversion unit 5 carries out color conversion from an image signal whose color has been changed by the third color correction conversion unit 8 into an image signal which can be output to the display device 6 so that the image signal is displayed by the display device 6 substantially the same color as the image signal whose color has been changed by the third color correction conversion unit 8 irrespective of the set color temperature of the light source for illustrating the display device 6 and therearound.

The display device 6 may be existent in the same apparatus as the electronic document color temperature information recognition unit 1, the recorded product observation light source color temperature information recognition unit 7, the third color correction conversion unit 8 and the second color correction conversion unit 5 or may be a separate unit which is connected to these units by a cable directly or through a network. When the display device 6 is a separate unit, the electronic document color temperature information recognition unit 1, the recorded product observation light source color temperature information recognition unit 7, the third color correction conversion unit 8 and the second color correction conversion unit 5 can be mounted on a device driver, for example. The electronic document color temperature information recognition unit 1, the recorded product observation light source color temperature information recognition unit 7, the third color correction conversion unit 8 and the second color conversion unit 5 may use CMM (Color Matching Module) incorporated in OS to process an image, or may use an existing image processing module in the image processing unit of the display device 6. Further, a program which describes these methods may be stored in a storage medium.

Figure 14:
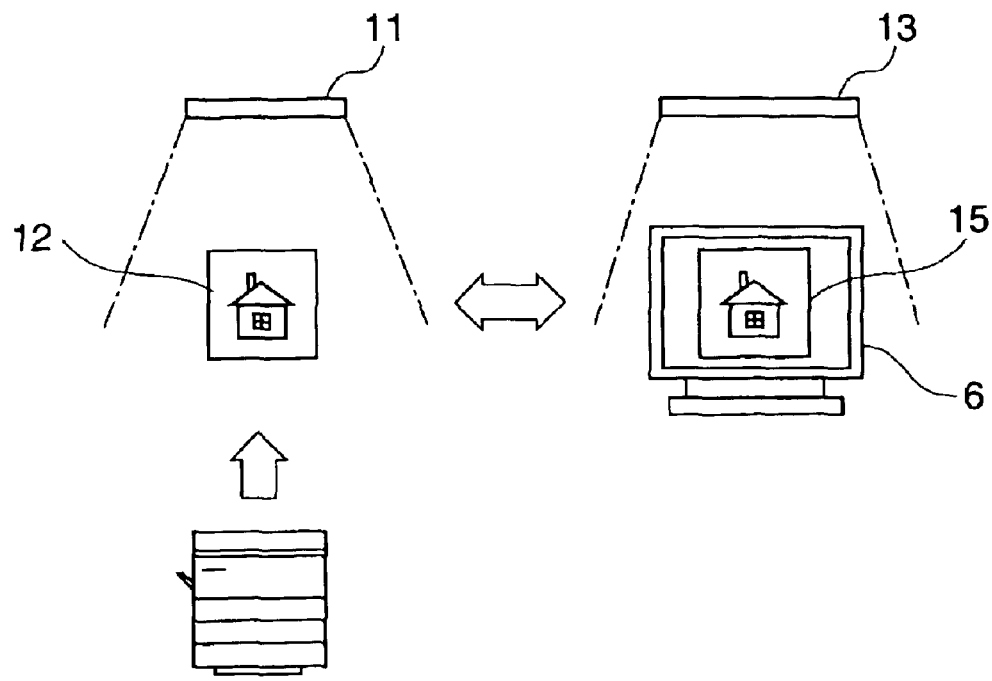
FIG. 14 is a schematic diagram for explaining the operation of the third embodiment of the present invention.
Figure 15:
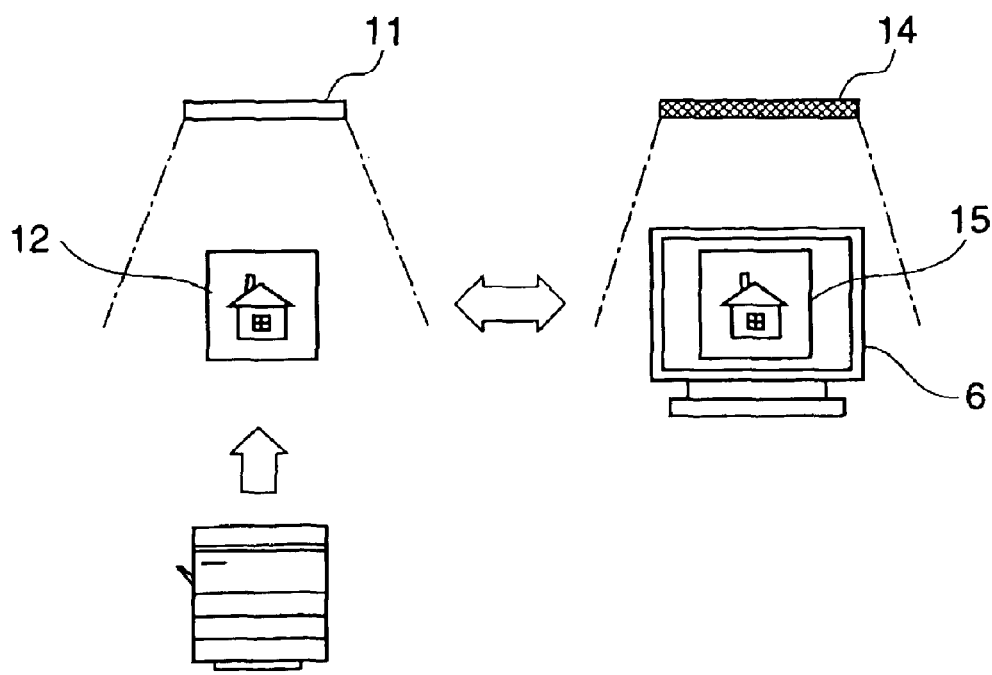
FIG. 15 is a schematic diagram for explaining another example of the operation of the third embodiment of the present invention.

FIG. 14 and FIG. 15 are schematic diagrams for explaining the operation of the third embodiment of the present invention. The same or corresponding elements as those in FIG. 2 and FIGS. 9A and 9B are given the same reference numerals. The electronic document 4 prepared and edited by a user are prepared and edited on the assumption of a certain color temperature. The electronic document 4 can be output as a recorded product 12 by forming an image on a recording medium by a desired output device. This recorded product 12 is observed under the light source 11. The appearance of an image observed is reflected on an image to be displayed on the display screen of the display device 6. To this end, the color temperature of the light source 11 for observing the recorded product 12 is recognized by the recorded product observation light source color temperature information recognition unit 7 and delivered to the third color correction conversion unit 8 and the second color correction conversion unit 5. The third color correction conversion unit 8 carries out color conversion from the electronic document 4 into an image signal having substantially the same color as a recorded product under the light source for observing the recorded product corresponding to the electronic document 4 based on the color temperature information of the electronic document 4 recognized by the electronic document color temperature information recognition unit 1 and the color temperature information of the light source 11 for observing the recorded product recognized by the recorded product observation light source color temperature information recognition unit 7. Further, the second color correction conversion unit 5 carries out color conversion from the image signal whose color has been changed by the third color correction conversion unit 8 into an image signal which can be output to the display device 6 based on the color temperature information of the light source 11 for observing the recorded product recognized by the recorded product observation light source color temperature information recognition unit 7 so that the image signal is displayed on the display device 6 substantially the same color as the image signal whose color has been changed by the third color correction conversion unit 8 irrespective of the set color temperature of the light source 13 for illuminating the display device 6 and therearound. The color converted image signal is input into the display device 6 and displayed on the display screen.

A recorded product is generally prepared by the output device on the assumption of a color temperature such as D50. However, most recorded products are observed under a light source (fluorescent lamps, etc.) having a color temperature of around 4000 K in an environment such as an office as the light source for observing the recorded product. According to the above constitution, an image obtained when a recorded product prepared on the assumption of a color temperature such as D50 is observed under a light source of around 4000 K, for example, can be simulated and reproduced as a display image 15 on the screen of the display device 6. For example, when a document is prepared using a DTP system, color which will be referred to by outputting the prepared document can be simulated on the display.

As shown in FIG. 15, the color temperature of the light source 14 for illuminating the display device 6 and the color temperature of the light source 11 for observing the recorded product 12 may differ from each other. In this case, the appearance of color of the displayed image 15 changes. Therefore, the recorded product 12 and the display image 15 can be made look the same by carrying out correction according to this change.

Thus, how the recorded product obtained by outputting the electronic document 4 from the output device looks can be simulated on the display device 6 by using the third embodiment of the present invention.

Figure 16A:
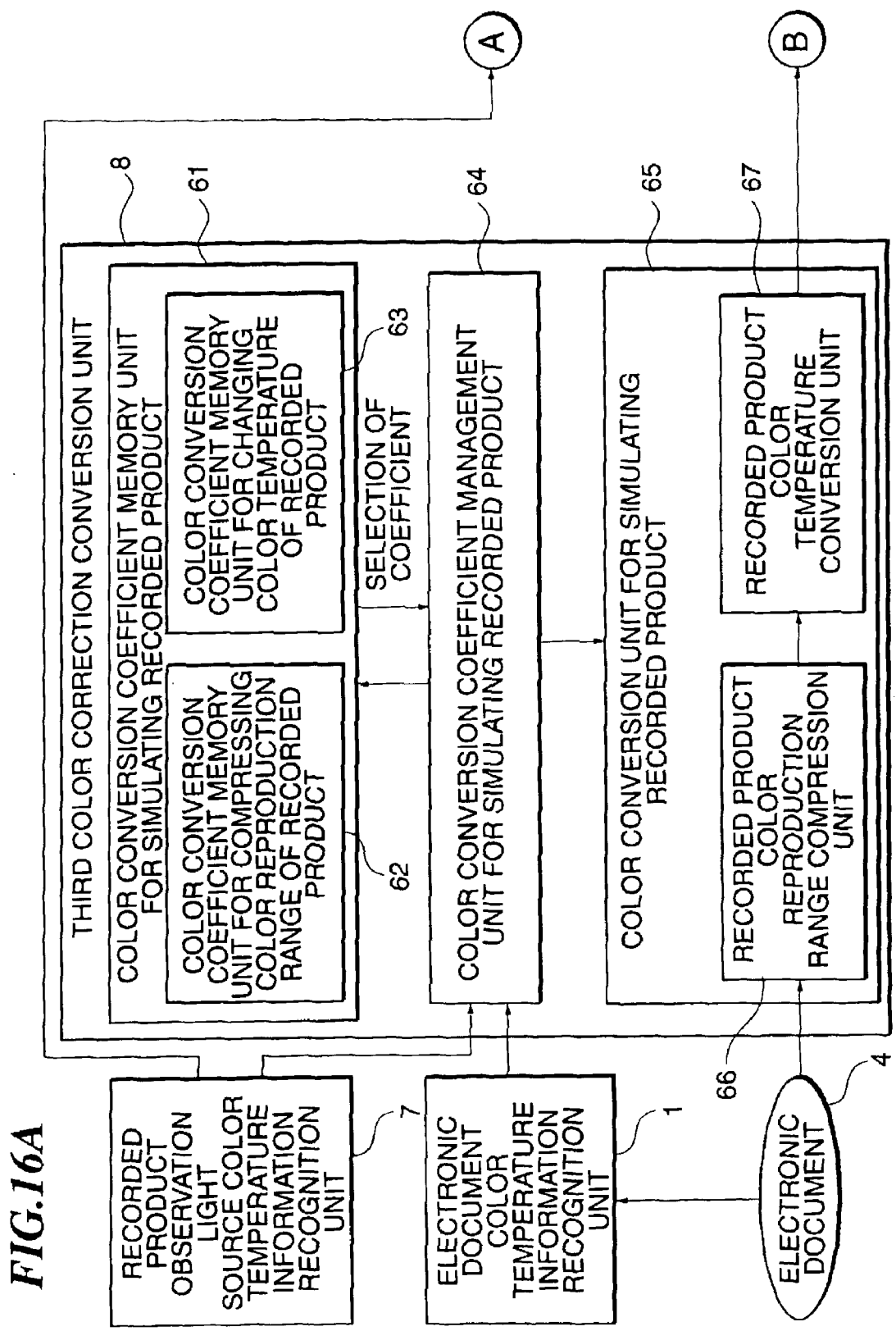
FIGS. 16A and 16B are block diagrams showing examples of a third color correction conversion unit and the second color correction conversion unit in the third embodiment of the present invention.
Figure 16B:
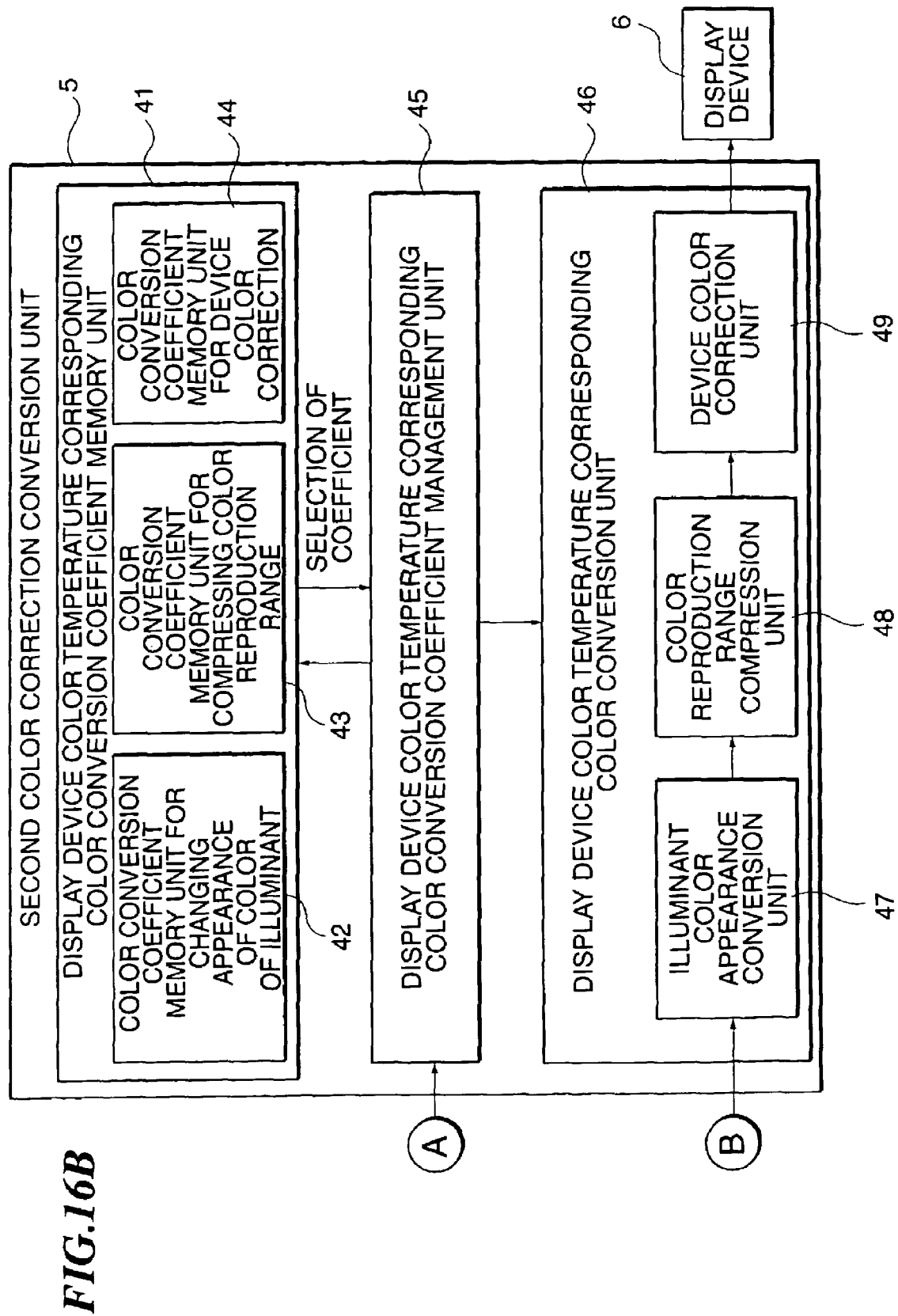

FIG. 16 is a block diagram showing examples of the third color correction conversion unit and the second color correction conversion unit in the third embodiment of the present invention. In FIG. 16, the same or corresponding elements as those in FIG. 10 and FIG. 13 are given the same reference numerals. Reference numeral 61 is a color conversion coefficient memory unit for simulating a recorded product, 62 color conversion coefficient memory unit for compressing the reproduction range of a recorded product, 63 color conversion coefficient memory unit for changing the color temperature of a recorded product, 64 color conversion coefficient management unit for simulating a recorded product, 65 color conversion unit for simulating a recorded product, 66 recorded product color reproduction range compression unit, and 67 recorded product color temperature conversion unit. In this example, a color conversion coefficient is selected according to the color temperature of the recorded product to be observed and the color temperature of the electronic document 4. Not shown, an image obtained by changing the color temperature of the electronic document to another color temperature using a color appearance model (for example, from D65 to D50) may be used as the electronic document 4.

The third color correction conversion unit 8 includes the color conversion coefficient memory unit 61 for simulating a recorded product, the color conversion coefficient management unit 64 for simulating a recorded product and the color conversion unit 65 for simulating a recorded product.

The color conversion coefficient memory unit 61 for simulating a recorded product stores one or more color conversion coefficients. In this example, the color conversion coefficient memory unit 61 for simulating a recorded product includes the color conversion coefficient memory unit 62 for compressing the color reproduction range of a recorded product and the color conversion coefficient memory unit 63 for changing the color temperature of a recorded product. The color conversion coefficient memory unit 62 for compressing the color reproduction range of a recorded product stores color conversion coefficients for compressing the color reproduction range of a recorded product. The color conversion coefficients for compressing the color reproduction range of a recorded product are used to remap image data in a color reproduction range which cannot be reproduced by the output device for outputting a recorded product to a reproducible range. In this example, the result of reproduction range compression processing by the output device is also simulated on the display device 6.

The color conversion coefficient memory unit 63 for changing the color temperature of a recorded product stores color conversion coefficients for changing the color temperature of a recorded product. The color conversion coefficients for changing the color temperature of a recorded product are used to convert CIEL*a*b* of an image signal under a standard observation light source (D50 or D65 in most cases) into CIEL*a*b* of a recorded product under the observation light source to correct color differences caused by a difference between the light sources. The color conversion coefficients for changing the color temperature of a recorded product may be created by a statistical technique using the color measurement value of the recorded product under the illumination of D50 as an input value and the color measurement value of the recorded product under the observation light source as an output value by preparing a color patch set for measurement.

The color conversion coefficient management unit 64 for simulating a recorded product selects a color conversion coefficients from plural color conversion coefficients stored in the color conversion coefficient memory unit 62 for compressing the color reproduction range of a recorded product and the color conversion coefficient memory unit 63 for changing the color temperature of a recorded product based on the color temperature information of the electronic document 4 and the color temperature information of a light source for observing the recorded product and delivers it to the color conversion unit 65 for simulating a recorded product. Alternatively, a new color conversion coefficient may be created from the plural color conversion coefficients and delivered to the color conversion unit 65 for simulating a recorded product.

The color conversion unit 65 for simulating a recorded product carries out color conversion from the electronic document 4 into an image signal having substantially the same color as a recorded product under a light source for observing the recorded product using the color conversion coefficient delivered from the color conversion coefficient management unit 64 for simulating a recorded product. In this example, the color conversion unit 65 for simulating a recorded product includes the recorded product color reproduction range compression unit 66 and the recorded product color temperature conversion unit 67. The recorded product color reproduction range compression unit 66 and the recorded product color temperature conversion unit 67 which have been supplied with respective color conversion coefficients carry out color conversion based on the color conversion coefficients and deliver the result to the second correction conversion unit 5.

In this example, the color conversion unit 65 for simulating a recorded product has two conversion units. However, two color conversion coefficients stored in the color conversion coefficient memory unit 61 for simulating a recorded product may be combined into a single color conversion coefficient so that the color conversion unit 65 for simulating a recorded product has only one color conversion unit.

The second color correction conversion unit 5 is basically the same as shown in FIG. 10 in the second embodiment. A brief description is given of the second color correction conversion unit 5. The second color conversion unit 5 includes the display device color temperature corresponding color conversion coefficient memory unit 41, display device color temperature corresponding color conversion coefficient management unit 45 and display device color temperature corresponding color conversion unit 46.

The display device color temperature corresponding color conversion coefficient memory unit 41 includes the color conversion coefficient memory unit 42 for changing the appearance of color of an illuminant, color conversion coefficient memory unit 43 for compressing color reproduction range and conversion coefficient memory unit 44 for device color correction. The color conversion coefficient memory unit 42 for changing the appearance of color of an illuminant stores color conversion coefficients for changing the appearance of color of an illuminant. The color conversion coefficients for changing the appearance of color of an illuminant are used to correct a difference in the appearance of color between the display device 6 and the recorded product. The color conversion coefficient memory unit 43 for compressing color reproduction range stores color conversion coefficients for compressing color reproduction range. The color conversion coefficients for compressing color reproduction range are used to remap image data which cannot be reproduced in a color reproduction range to a reproducible range because the actual reproduction range (color reproduction area) of the display device is shrunk by the reflection of environmental light around the display device upon the display screen of the display device. The conversion coefficient memory unit 44 for device color correction stores device correction color conversion coefficients. The device correction color conversion coefficients are used to convert an image signal on CIEL*a*b* color space calculated from the color temperature information of the electronic document 4 into device (display device 6) dependent R (red), G (green) and B (blue) color spaces.

The display device color temperature corresponding color conversion coefficient management unit 45 selects a color conversion coefficient from plural color conversion coefficients stored in the color conversion coefficient memory unit 42 for changing the appearance of color of an illuminant, color conversion coefficient memory unit 43 for compressing color reproduction range and conversion coefficient memory unit 44 for device color correction based on the color temperature information of a light source for observing the recorded product and delivers it to the display device color temperature corresponding color conversion unit 46. Alternatively, a new color conversion coefficient is created from the plural color conversion coefficients and delivered to the display device color temperature corresponding color conversion unit 46.

The display device color temperature corresponding color conversion unit 46 includes the illuminant color appearance conversion unit 47, color reproduction range compression unit 48 and device color correction unit 49. The illuminant color appearance conversion unit 47, color reproduction range compression unit 48 and device color correction unit 49 which have been supplied with respective color conversion coefficients carry out color conversion based on the color conversion coefficients to finally obtain an image signal which can be output to the display device 6 and outputs it to the display device 6.

The display device color temperature corresponding color conversion unit 46 has three conversion units. Three color conversion coefficients stored in the display device color temperature corresponding color conversion coefficient memory unit 41 may be combined together into one or two color conversion coefficients so that the display device color temperature corresponding conversion unit 46 has one or two color conversion units.

Figure 17A:
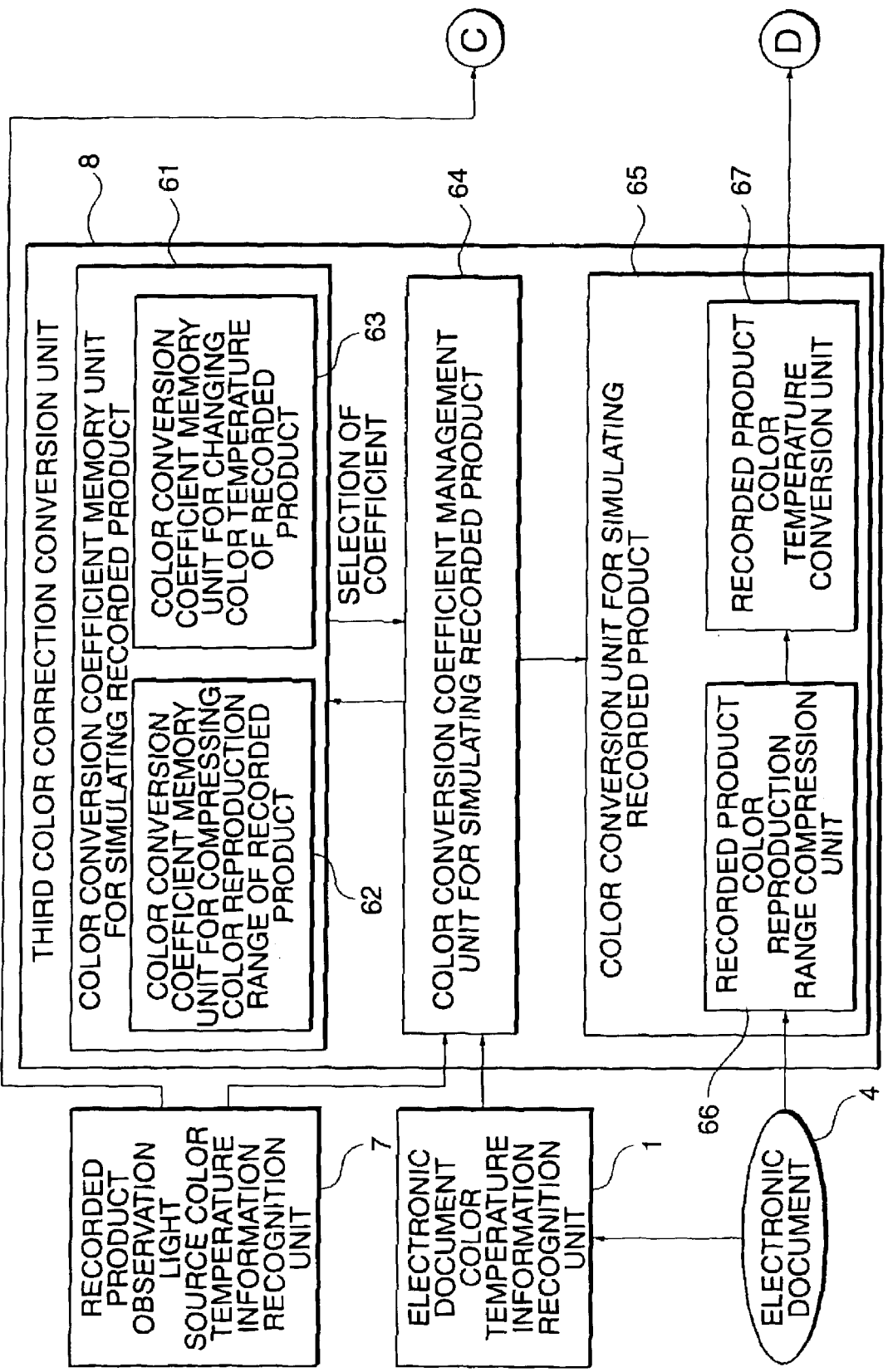
FIGS. 17A and 17B are block diagrams showing other examples of the third color correction conversion unit and the second color correction conversion unit in the third embodiment of the present invention.
Figure 17B:
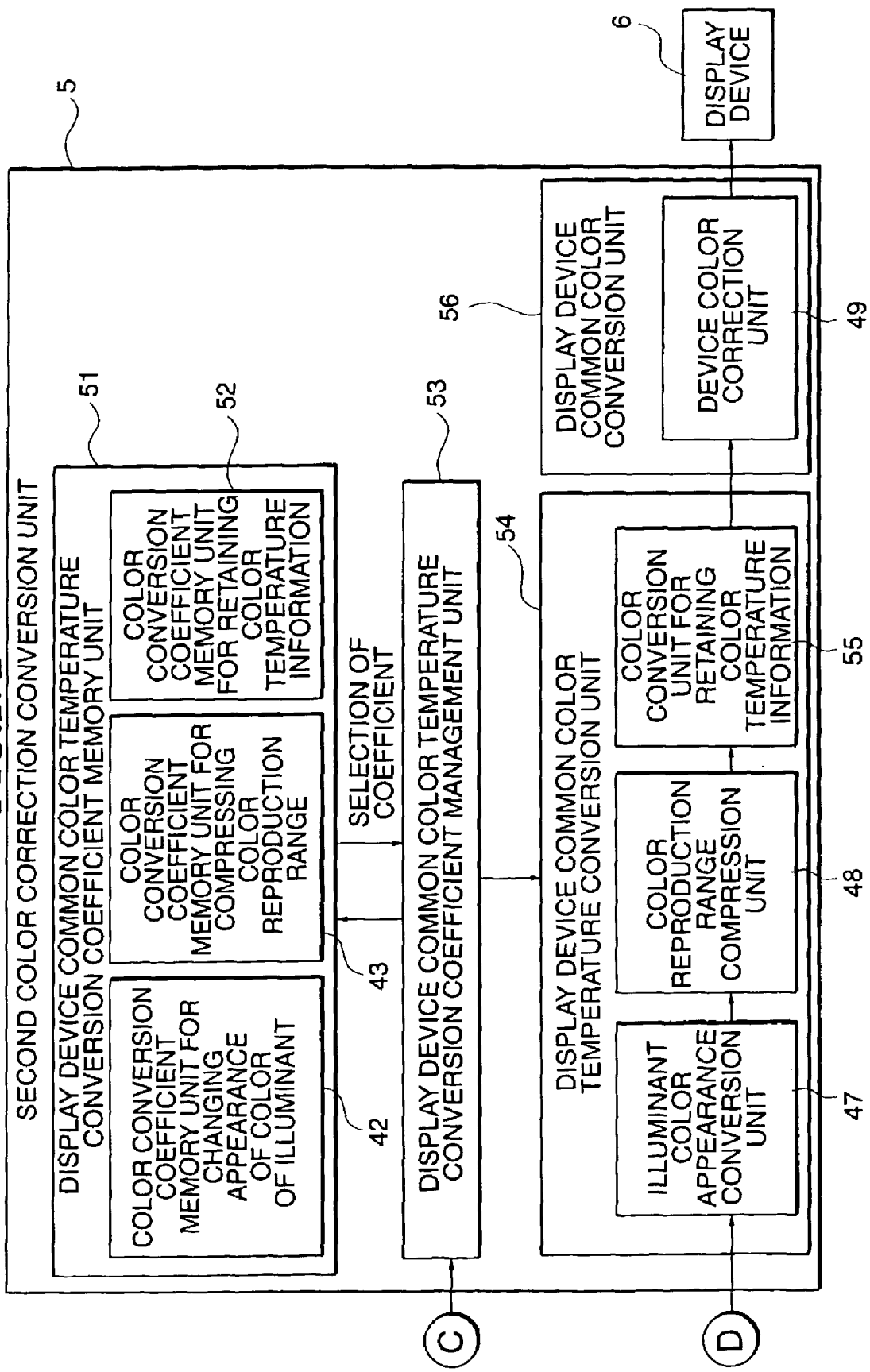

FIG. 17 is a block diagram showing other examples of the third color correction conversion unit and the second color correction conversion unit in the third embodiment of the present invention. In FIG. 17, the same or corresponding elements as those in FIG. 11, FIG. 13 and FIG. 16 are given the same reference numerals. What differs from FIG. 16 is that a common color conversion coefficient is used for the processing of the device color correction unit 49. In this example, the second color correction conversion unit 5 shown in FIG. 11 of the above second embodiment is used as the second color correction conversion unit 5 shown in FIG. 16. A brief description of the second color correction conversion unit 5 is given below though it is overlapped.

The third color correction conversion unit 8 includes the color conversion coefficient memory unit 61 for simulating a recorded product, color conversion coefficient management unit 64 for simulating a recorded product and color conversion unit 65 for simulating a recorded product. The color conversion coefficient memory unit 61 for simulating a recorded product includes the color conversion coefficient memory unit 62 for compressing the color reproduction range of a recorded product and the color conversion coefficient memory unit 63 for changing the color temperature of a recorded product. The color conversion coefficient memory unit 62 for compressing the color reproduction range of a recorded product stores color conversion coefficients for compressing the color reproduction range of a recorded product. The color conversion coefficients for compressing the color reproduction range of a recorded product are used to remap image data in a color reproduction range which cannot be reproduced by the output device to a reproducible range. The result of color reproduction range compression processing by the output device is also simulated on the display device. The color conversion coefficient memory unit 63 for changing the color temperature of a recorded product stores color conversion coefficients for changing the color temperature of a recorded product. The color conversion coefficients for changing the color temperature of a recorded product are used to convert CIEL*a*b* of an image signal under a standard observation light source (D50 or D65 in most cases) to CIEL*a*b* of a recorded product under the observation light source to correct color differences caused by a difference between the light sources.

The color conversion coefficient management unit 64 for simulating a recorded product selects a color conversion coefficient from plural color conversion coefficients stored in the color conversion coefficient memory unit 62 for compressing the color reproduction range of a recorded product and the color conversion coefficient memory unit 63 for changing the color temperature of a recorded product based on the color temperature information of the electronic document and the color temperature information of the light source for observing the recorded product or creates a new color conversion coefficient from the plural color conversion coefficients and delivers it to the color conversion unit 65 for simulating a recorded product.

The color conversion unit 65 for simulating a recorded product includes the recorded product color reproduction range compression unit 66 and the recorded product color temperature conversion unit 67. The recorded product color reproduction range compression unit 66 and recorded product color temperature conversion unit 67 which have been supplied with respective color conversion coefficients carry out color conversion based on the color conversion coefficients and deliver the result to the second color correction conversion unit 5.

In this example, the color conversion unit 65 for simulating a recorded product has two conversion units. Two color conversion coefficients stored in the color conversion coefficient memory unit 61 for simulating a recorded product may be combined together into one color conversion coefficient so that the color conversion unit 65 for simulating a recorded product has only one color conversion unit.

The second color correction conversion unit 5 includes the display device common color temperature conversion coefficient memory unit 51, display device common color temperature conversion coefficient management unit 53, display device common color temperature conversion unit 54 and display device common color conversion unit 56.

The display device common color temperature conversion coefficient memory unit 51 includes the color conversion coefficient memory unit 42 for changing the appearance of color of an illuminant, color conversion coefficient memory unit 43 for compressing color reproduction range and color conversion coefficient memory unit 52 for retaining color temperature information. The color conversion coefficient memory unit 42 for changing the appearance of color of an illuminant stores color conversion coefficients for changing the appearance of color of an illuminant. The color conversion coefficients for changing the appearance of color of an illuminant are used to correct a difference in the appearance of color between the display device 6 and the recorded product. The color conversion coefficient memory unit 43 for compressing color reproduction range stores color conversion coefficients for compressing color reproduction range. The color conversion coefficients for compressing color reproduction range are used to remap the value of an image signal which cannot be reproduced in a color reproduction range to a reproducible range because the actual color reproduction range (color reproduction area) of the display device 6 is shrunk by the reflection of environmental light around the display device 6 upon the display screen of the display device 6. The color conversion coefficient memory unit 52 for retaining color temperature information stores color conversion coefficients for retaining color temperature information. The color conversion coefficients for retaining color temperature information are used to convert chromaticity corresponding to the color temperature of the electronic document 4 into a substantially equivalent color under the observation light source used by the device color correction unit 49 to absorb the difference of chromaticity when the color temperature of the electronic document changes.

The display device common color temperature conversion coefficient management unit 53 selects a color conversion coefficient from plural color conversion coefficients stored in the color conversion coefficient memory unit 42 for changing the appearance of color of an illuminant, color conversion coefficient memory unit 43 for compressing color reproduction range and color conversion coefficient memory unit 52 for retaining color temperature information based on the color temperature information of the light source for observing the recorded product or creates a new color conversion coefficient from the plural color conversion coefficients and delivers it to the display device common color temperature conversion unit 54.

The display device common color temperature conversion unit 54 includes the illuminant color appearance conversion unit 47, color reproduction range compression unit 48 and color conversion unit 55 for retaining color temperature information. The illuminant color show conversion unit 47, color reproduction range compression unit 48 and color conversion unit 55 for retaining color temperature information which have been supplied with respective color conversion coefficients carry our color conversion on the electronic document 4 and deliver the processing result to the display device common color conversion unit 56. The color conversion unit 55 for retaining color temperature information has been explained with reference to FIG. 11 in the above second embodiment and uses color conversion coefficients for retaining color temperature information stored in the color conversion coefficient memory unit 52 for retaining color temperature information to convert chromaticity corresponding to the color temperature of the electronic document 4 into a substantially equivalent color under the observation light source used by the device color correction unit 49. Thereby, the difference of chromaticity is absorbed when the color temperature of the electronic document 4 changes.

The display device common color conversion unit 56 includes the device color correction unit 49. The device color correction unit 49 uses a predetermined color conversion coefficient to carry out color conversion to finally obtain an image signal which can be output to the display device 6 and outputs it to the display device 6. The color conversion coefficient used by the device color correction unit 49 may be stored in the display device common color temperature conversion coefficient memory unit 51.

According to this constitution, an image of a recorded product obtained by outputting the electronic document 4 from the output device when it is observed under a certain light source can be simulated and can be displayed on the display screen of the display device 6. Thereby, an image can be formed and edited by DTP, for example, with reference to the appearance of the image of the recorded product.

In the above description, as shown in FIG. 14 and FIG. 15, the case where a recorded product output from the output device, as typified by an electrophotograph, is simulated on the display device has been explained. However, the present invention is not limited to this case but even when an actual document such as a photo is actually displayed on the display device, it can be simulated in the same manner. In this case, in the constitution shown in FIG. 16 and FIG. 17, a color conversion coefficient to be used by the recorded product color temperature conversion unit 67 may be changed. This is because the direction and amount of color difference differ according to the difference of color reproducibility of an output device including a color material. The functions of other units are completely the same as those shown in FIG. 16 and FIG. 17.

Figure 18:
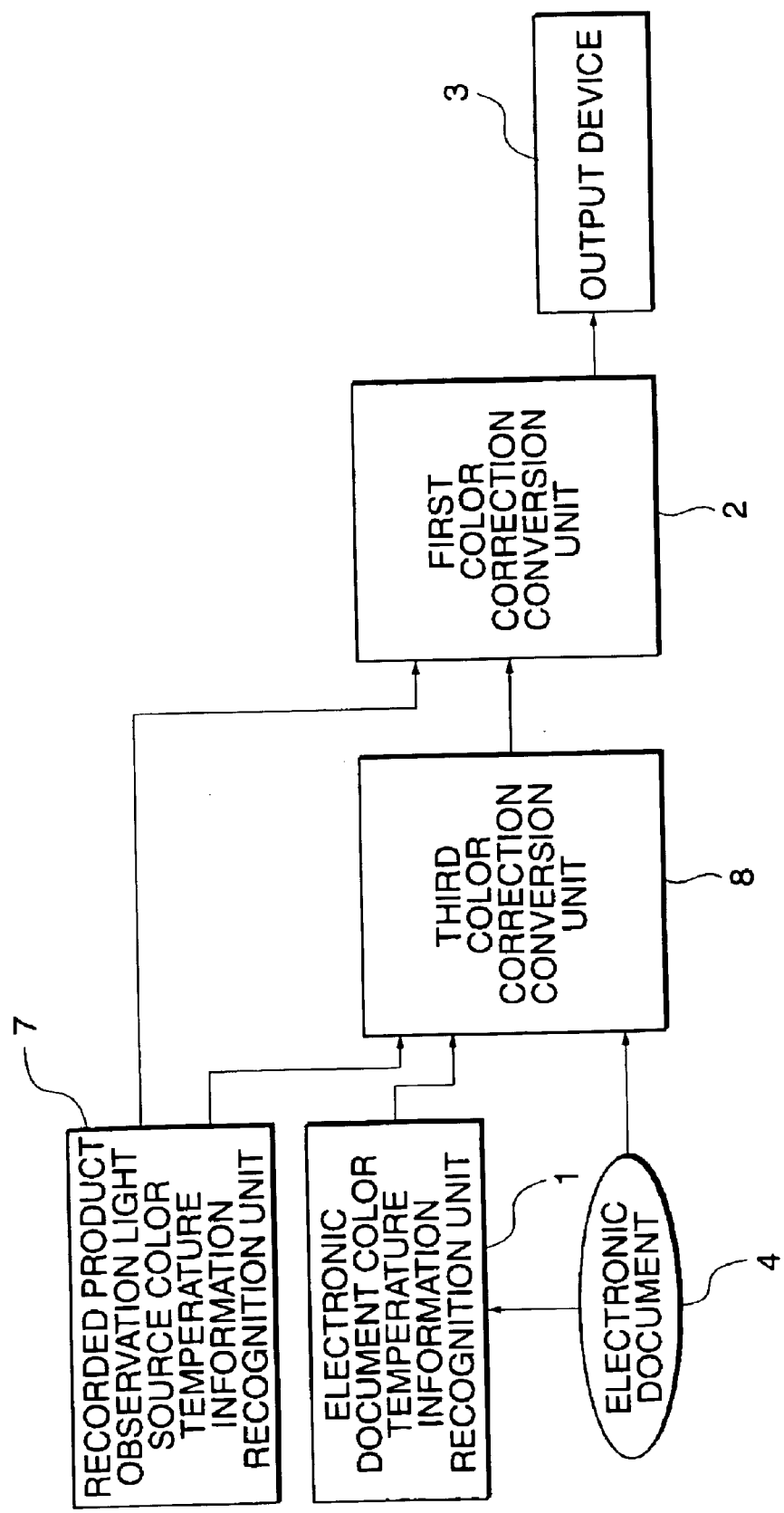
FIG. 18 is a block diagram of a fourth embodiment of the present invention.

FIG. 18 is a block diagram of a fourth embodiment of the present invention. In FIG. 18, the same or corresponding elements as those in FIG. 1 and FIG. 13 are given the same reference numerals. In the above first embodiment, the electronic document is output to the output device at the color temperature of the electronic document. In contrast to this, this fourth embodiment shows a case where when a second recorded product which differs from a first recorded product handled by the output device in color reproducibility is observed under a light source having predetermined color temperature and strength distribution (same as those of the electronic document) or a light source having different color temperature and strength distribution, color correction conversion is carried out to reproduce an image substantially equivalent to the observed second recorded product with the first recorded product so as to simulate the second recorded product.

The electronic document color temperature information recognition unit 1 recognizes the color temperature information of the electronic document 4 and delivers the recognized color temperature information of the electronic document 4 to the third color correction conversion unit 8 like the first to third embodiments. The color temperature information may be three stimulus values, color temperature name (D50, F8, etc.), CIE1931xy chromaticity, CIE1931XYZ chromaticity or spectral characteristic data like the above first to third embodiments. When the color temperature information is a color signal of subtractive color mixture system such as three color (cyanide (C), magenta (M) and yellow (Y)) separation which is commonly used for printing, four color (the above three colors and black (K)) separation, or five or more color (CMYK and another color) separation, the information is recognized and a D50 light source may be automatically set.

The recorded product observation light source color temperature information recognition unit 7 recognized whether color information on the predetermined color of the second recorded product under the observation light source is a measurement value or value specified by a user and delivers the result to the third color correction conversion unit 8 and the first color correction conversion unit 2. The measurement data obtained by a measuring instrument and the value specified by the user are the same as in the above third embodiment.

The third color correction conversion unit 8 carries out color conversion from the electronic document 4 into an image signal having substantially the same color as a second recorded product corresponding to the electric document 4 under a light source for observing the second recorded product based on the color temperature information of the electronic document recognized by the electronic document color temperature information recognition unit 1 and the color temperature information of the light source for observing the second recorded product recognized by the recorded product observation light source color temperature information recognition unit 7.

The first color correction conversion unit 2 is the same as that of the above first embodiment. However, in this fourth embodiment, it receives the color temperature information of the light source for observing the second recorded product recognized by the recorded product observation light source color temperature information recognition unit 7. Based on this color temperature information, the first color correction conversion unit 2 carries out color conversion from an image signal whose color has been changed by the third color correction conversion unit 8 into an image signal which can be output to the output device 3 so that the first recorded product assumes substantially the same color as the image signal whose color has been converted by the third color correction conversion unit 8 when it is observed under a predetermined illumination light source.

The output device 3 may be existent in the same apparatus as the electronic document color temperature information recognition unit 1, the recorded product observation light source color temperature information recognition unit 7, the third color correction conversion unit 8 and the first color correction conversion unit 2, or may be a separate unit which is connected to these units by a cable directly or through a network. When the output device 3 is a separate unit, the electronic document color temperature information recognition unit 1, the recorded product observation light source color temperature information recognition unit 7, the third color correction conversion unit 8 and the first color correction conversion unit 2 can be mounted on a device driver, for example. The electronic document color temperature information recognition unit 1, the recorded product observation light source color temperature information recognition unit 7, the third color correction conversion unit 8 and the first color correction conversion unit 2 may use CMM (Color Matching Module) incorporated in OS to process an image, or may use an existing image processing module in the image processing unit of the output device 3. Further, a program which describes these methods may be stored in a storage medium.

Figure 19:
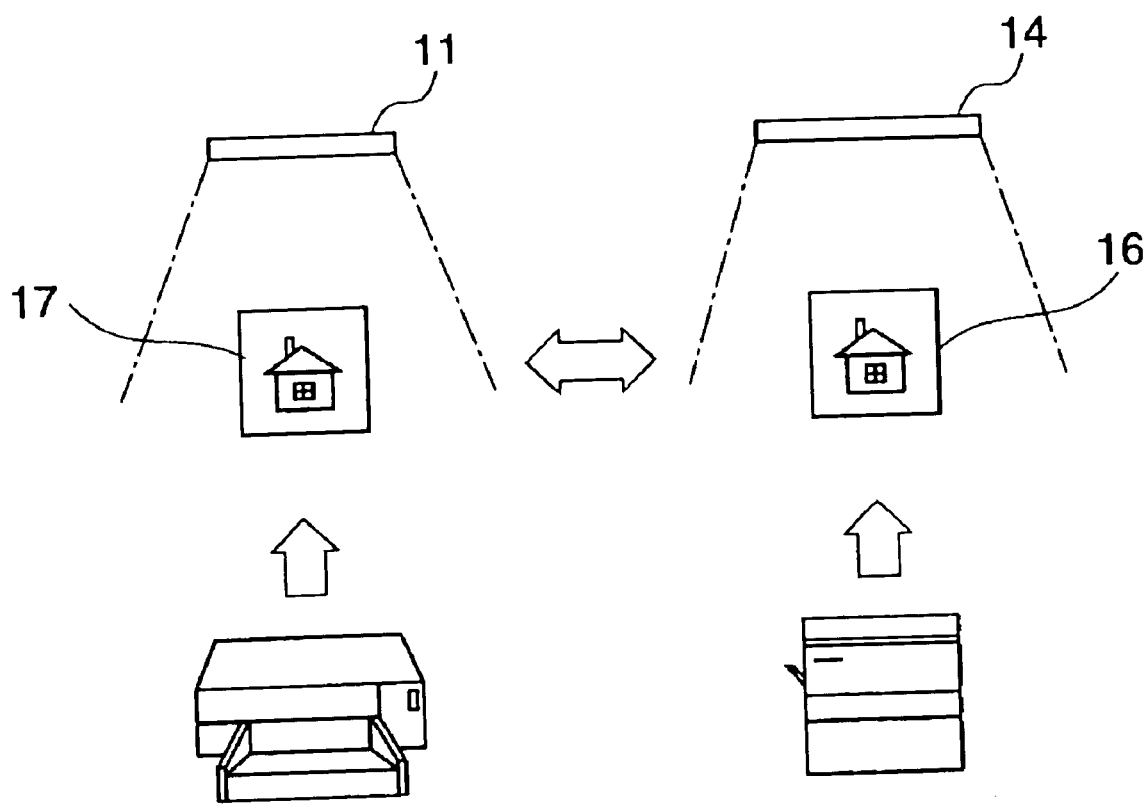
FIG. 19 is a schematic diagram for explaining the operation of the fourth embodiment of the present invention.

FIG. 19 is a schematic diagram for explaining the operation of the fourth embodiment of the present invention. In FIG. 19, the same or corresponding elements as those in FIG. 2 and FIG. 14 are given the same reference numerals. Reference numeral 16 denotes a first recorded product and 17 a second recorded product. The electronic document 4 prepared and edited by a user is prepared and edited on the assumption of a certain color temperature. The electronic document 4 is formed on a recording medium as an image by a desired output device. When it is output by the output device 3, it becomes the first recorded product 16 and when it is output by another output device having different color reproducibility, it becomes the second recorded product 17. When the second recorded product 17 is observed under the light source 11 at this point, it is reflected on the output of the first recorded product 16 so that the first recorded product 16 looks substantially the same as the second recorded product 17. To this end, the color temperature of the light source 11 for observing the second recorded product 17 is recognized by the recorded product observation light source color temperature information recognition unit 7 and delivered to the third color correction conversion unit 8 and the second color correction conversion unit 5. The third color correction conversion unit 8 carries out color conversion from the electronic document 4 into an image signal having substantially the same color as a second recorded product under a light source for observing the second recorded product corresponding to the electronic document 4 based on the color temperature information of the electronic document 4 recognized by the electronic document color temperature information recognition unit 1 and the color temperature information of the light source 11 for observing the second recorded product 17 recognized by the recorded product observation light source color temperature information recognition unit 7. Further, the first color correction conversion unit 2 carries out color conversion from the image signal whose color has been converted by the third color correction conversion unit 8 into an image signal which can be output to the output device 3 based on the color temperature information of the light source 11 for observing the second recorded product recognized by the recorded product observation light source color temperature information recognition unit 7 so that the first recorded product 16 assumes substantially the same color as the image signal whose color has been changed by the third color correction conversion unit 8 when it is observed under the predetermined illumination light source 14. The output device 3 forms an image on a recording medium based on the color converted image signal to produce the first recorded product 16.

When an image is formed by using an output device having different color reproducibility, even if the same electronic document is used, the produced recorded product looks different. According to the above constitution, by obtaining the first recorded product produced with color reproducibility different from that of the second recorded product, the appearance of color of the second recorded product can be reproduced with the first recorded product. For example, when a sample of printed matter is to be output from an output device different from that of the actual printed matter, the appearance of color of the actual printed matter can be reproduced with the sample, thereby making it possible to correct color smoothly.

Figure 20A:
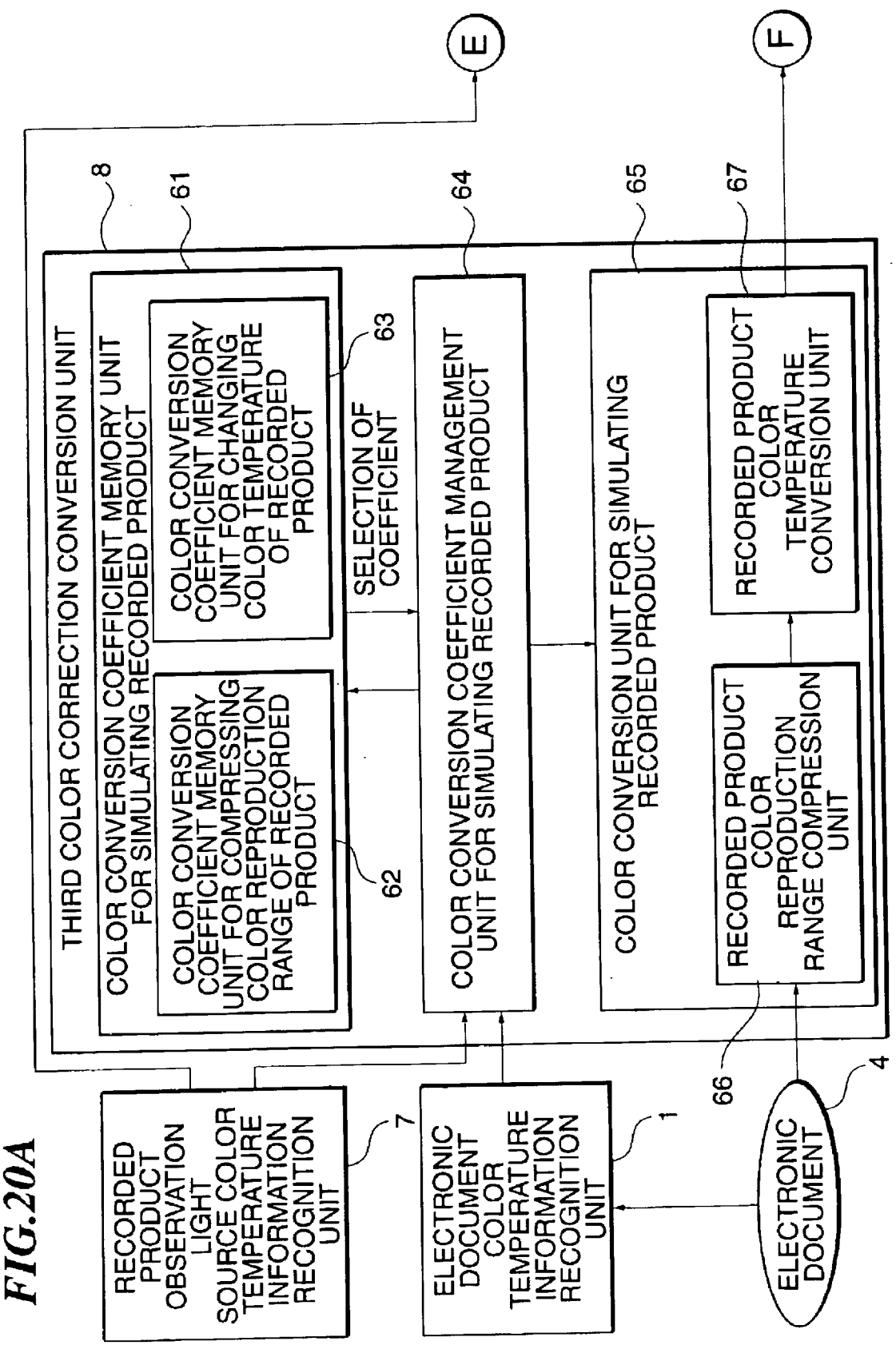
FIGS. 20A and 20B are block diagrams showing examples of the third color correction conversion unit and the first color correction conversion unit in the fourth embodiment of the resent invention.
Figure 20B:
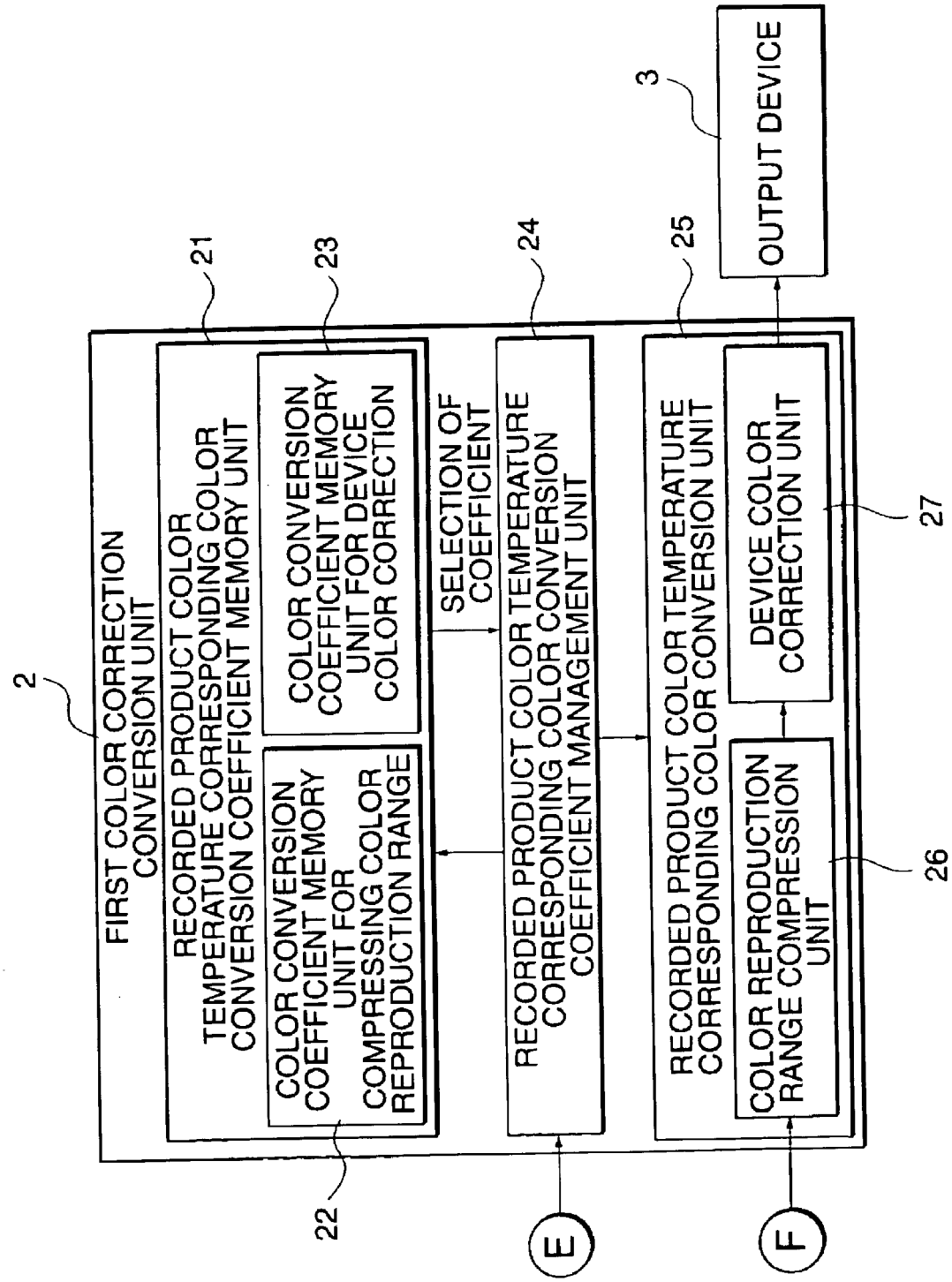

FIG. 20 is a block diagram showing examples of the third color correction conversion unit and the first color correction conversion unit in the fourth embodiment of the present invention. In FIG. 20, the same and corresponding elements as those in FIG. 3, FIG. 16 and FIG. 18 are given the same reference numerals. In this example, a color conversion coefficient is selected by the color temperature of the electronic document 4 and the color temperature of the second recorded product to be observed. Not shown, an image obtained by changing the color temperature of the electronic document to another color temperature using a color appearance model (for example, from D65 to D50) may be used as the electronic document 4.

The third color correction conversion unit 8 includes the color conversion coefficient memory unit 61 for simulating a recorded product, color conversion coefficient management unit 64 for simulating a recorded product and color conversion unit 65 for simulating a recorded product.

The color conversion coefficient memory unit 61 for simulating a recorded product stores one or more color conversion coefficients. In this example, the color conversion coefficient memory unit 61 for simulating a recorded product includes the color conversion coefficient memory unit 62 for compressing the color reproduction range of a recorded product and the color conversion coefficient memory unit 63 for changing the color temperature of a recorded product. Since color conversion coefficients for compressing the color reproduction range of a recorded product and color conversion coefficients for changing the color temperature of a recorded product stored in the color conversion coefficient memory unit 62 for compressing the color reproduction range of a recorded product and the color conversion coefficient memory unit 63 for changing the color temperature of a recorded product are the same as those of the above third embodiment, their descriptions are omitted.

The color conversion coefficient management unit 64 for simulating a recorded product selects a color conversion coefficient from plural color conversion coefficients stored in the color conversion coefficient memory unit 62 for compressing the color reproduction range of a recorded product and the color conversion coefficient memory unit 63 for changing the color temperature of a recorded product based on the color temperature information of the electronic document 4 and the color temperature information of the light source for observing the second recorded product and delivers it to the color conversion unit 65 for simulating a recorded product. Alternatively, a new color conversion coefficient may be created from the plural color conversion coefficients and delivered to the color conversion unit 65 for simulating a recorded product.

The color conversion unit 65 for simulating a recorded product uses the color conversion coefficient delivered from the color conversion coefficient management unit 64 for simulating a recorded product to carry out color conversion from the electronic document 4 into an image signal having substantially the same color as a second recorded product under a light source for observing the second recorded product. In this example, the color conversion unit 65 for simulating a recorded product includes the recorded product color reproduction range compression unit 66 and the recorded product color temperature conversion unit 67. The recorded product color reproduction range compression unit 66 and the recorded product color temperature conversion unit 67 which have been supplied with respective color conversion coefficients carry out color conversion based on the color conversion coefficients and deliver the result to the first color correction conversion unit 2.

In this example, the color conversion unit 65 for simulating a recorded product has two conversion units. However, two color conversion units in the color conversion coefficient memory unit 61 for simulating a recorded product may be combined into one color conversion coefficient so that the color conversion unit 65 for simulating a recorded product has only one color conversion unit.

The first color correction conversion unit 2 is basically the same as in FIG. 3 of the above first embodiment. The first color correction conversion unit 2 will be described briefly hereunder. The first color correction conversion unit 2 includes the recorded product color temperature corresponding color conversion coefficient memory unit 21, recorded product color temperature corresponding color conversion coefficient management unit 24 and recorded product color temperature corresponding color conversion unit 25.

The recorded product color temperature corresponding color conversion coefficient memory unit 21 stores more thane one color conversion coefficient. In this example, the recorded product color temperature corresponding color conversion coefficient memory unit 21 includes the color conversion coefficient memory unit 22 for compressing color reproduction range and the color conversion coefficient memory unit 23 for device color correction. Since color conversion coefficients for compressing color reproduction range and device correction color conversion coefficients stored in the color conversion coefficient memory unit 22 for compressing color reproduction range and color conversion coefficient memory unit 23 for device color correction are the same as those in the first embodiment, their descriptions are omitted.

The recorded product color temperature corresponding color conversion coefficient management unit 24 selects a color conversion coefficient from plural color conversion coefficients stored in the color conversion coefficient memory unit 22 for compressing color reproduction range and the color conversion coefficient memory unit 23 for device color correction based on the color temperature information of the recorded product observation light source recognized by the recorded product observation light source color temperature information recognition unit 7 and delivers it to the recorded product color temperature corresponding color conversion unit 25. Alternatively, a new color conversion coefficient may be created from the plural color conversion coefficients and delivered to the recorded product color temperature corresponding color conversion unit 25.

The recorded product color temperature corresponding color conversion unit 25 carries out color conversion from the image signal delivered from the third color correction conversion unit 8 into an image signal which can be output from the output device 3 based on the color conversion coefficient delivered from the recorded product color temperature corresponding color conversion coefficient management unit 24. In this example, the recorded product color temperature corresponding color conversion unit 25 includes the color reproduction range compression unit 26 and the device color correction unit 27. The color reproduction range compression unit 26 and device color correction unit 27 which have been supplied with respective color conversion coefficients carry out color conversion based on the color conversion coefficients to finally obtain an image signal which can be output and outputs it to the output device 3.

In this example, the recorded product color temperature corresponding color conversion unit 25 has two conversion units. However, when two conversion coefficients stored in the recorded product color temperature corresponding color conversion unit 25 are 3-D LUTs, they may be combined into one color conversion coefficient (3-D LUT) so that the recorded product color temperature corresponding color conversion unit 25 has only one color conversion unit. Thereby, an error at the time of color conversion generated by using the 3-D LUT multiple times can be suppressed and the processing speed can be improved.

Figure 21B:
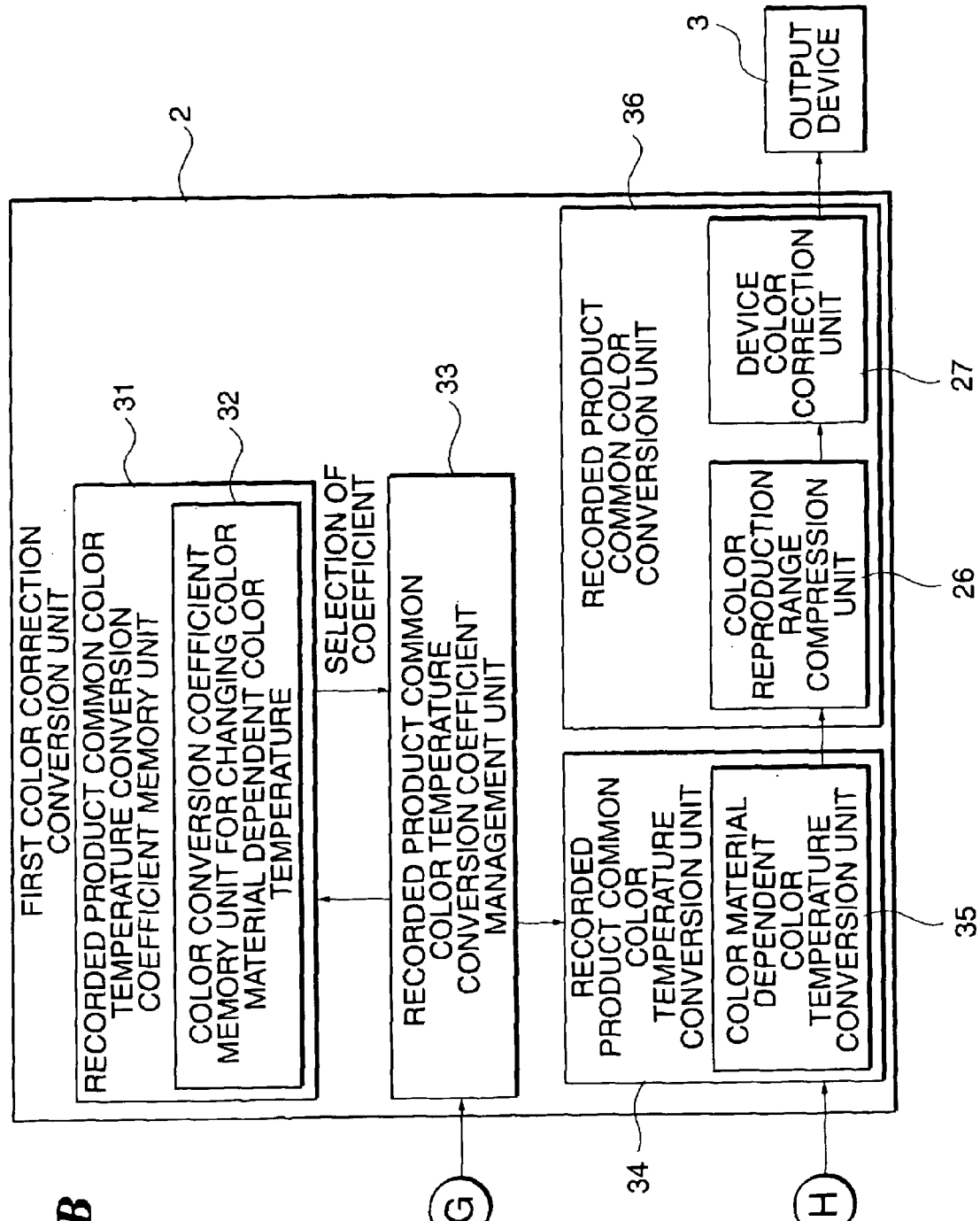

FIG. 21 is a block diagram showing other examples of the third color correction conversion unit and the first color correction conversion unit in the fourth embodiment of the present invention. In FIG. 21, the same or corresponding elements as those in FIG. 6, FIG. 17 and FIG. 18 are given the same reference numerals. What differs from FIG. 20 is that a common color conversion coefficient is used in the processing of the device color correction unit 27. In this example, the first color correction conversion unit 2 shown in FIG. 6 in the above first embodiment is used as the first color correction conversion unit 2 shown in FIG. 20. In this example, a difference in the color temperature of the electronic document 4 is absorbed by the color material dependent color temperature conversion unit 35 which will be described hereinafter and only a predetermined color conversion coefficient (for example, D50) is used for other color temperatures thereafter. Since the constitution of the fourth embodiment is the same as the constitution of FIG. 20 excluding the first color correction conversion unit 2, its description is omitted. Since the constitution of the first color correction conversion unit 2 is almost the same as the constitution of the first color correction conversion unit 2 shown in FIG. 6 in the above first embodiment, it will be described briefly.

The first color correction conversion unit 2 includes the recorded product common color temperature conversion coefficient memory unit 31, recorded product common color temperature conversion coefficient management unit 33, recorded product common color temperature conversion unit 34 and recorded product common color conversion unit 36. Not shown, an image obtained by changing the color temperature of the electronic document to another color temperature (for example, from D65 to D50) using a color appearance model may be used as the electronic document 4.

The recorded product common color temperature conversion coefficient memory unit 31 stores one or more color conversion coefficients and has the color conversion coefficient memory unit 32 for changing color material dependent color temperature. Color conversion coefficients for changing color material dependent color temperature stored in the color conversion coefficient memory unit 32 for changing color material dependent color temperature are the same as those of the first embodiment shown in FIG. 6.

The recorded product common color temperature conversion coefficient management unit 33 selects a color conversion coefficient from plural color conversion coefficients stored in the color conversion coefficient memory unit 32 for changing color material dependent color temperature based on the color temperature information of the light source for observing the recorded product recognized by the recorded product observation light source color temperature information recognition unit 7 or creates a new color conversion coefficient from the plural color conversion coefficients and delivers it to the recorded product common color temperature conversion unit 34.

The recorded product common color temperature conversion unit 34 carries out color conversion from an image signal delivered from the third color correction conversion unit 8 into an image signal having a common color temperature according to the color conversion coefficient delivered from the recorded product common color temperature conversion coefficient management unit 33. In this example, the recorded product common color temperature conversion unit 34 has the color material dependent color temperature conversion unit 35. The color material dependent color temperature conversion unit 35 carries out color conversion on the image signal delivered from the third color correction conversion unit 8 according to the color conversion coefficient delivered from the recorded product common color temperature conversion coefficient management unit 33 and delivers the processing result to the recorded product common color conversion unit 36.

The recorded product common color conversion unit 36 carries out color conversion from an image signal whose color has been changed by the recorded product common color temperature conversion unit 34 into an image signal which can be finally output from the output device 3 using a color conversion coefficient corresponding to a common color temperature which is targeted when color conversion is carried out by the recorded product common color temperature conversion unit 34 (color material dependent color temperature conversion unit 35) and outputs it to the output device 3. In this example, the recorded product common color conversion unit 36 includes the color reproduction range compression unit 26 and the device color correction unit 27. The color reproduction range compression unit 26 and the device color correction unit 27 which have been supplied with respective color conversion coefficients carry out color conversion based on the color conversion coefficients to finally obtain a signal which can be output and outputs it to the output device 3. The color reproduction range compression unit 26 and the device color correction unit 27 are basically the same as those shown in FIG. 20 and differs from those only in that a common conversion coefficient is used.

According to the constitution of the fourth embodiment, an image substantially equivalent to the second recorded product can be reproduced with the first recorded product having different color reproducibility, thereby making it possible to simulate the second recorded product. In this case, the output device for forming an image on the second recorded product and the output device 3 for forming an image on the first recorded product may differ from each other. Thereby, an image on the final second recorded product can be formed, edited and proofed with reference to the first recorded product.

The first to fourth embodiments have been described. In the second and third embodiments out of these, a mode for reproducing the document faithfully as described in the second embodiment and a mode for simulating the document on the display screen as described in the third embodiment can be switched using the same display device 6. Also in the first and fourth embodiments, a mode for reproducing the document faithfully as described in the first embodiment and a mode for simulating the second recorded product with the first recorded product as described in the fourth embodiment can be switched using the same output device 3.

Figure 22:
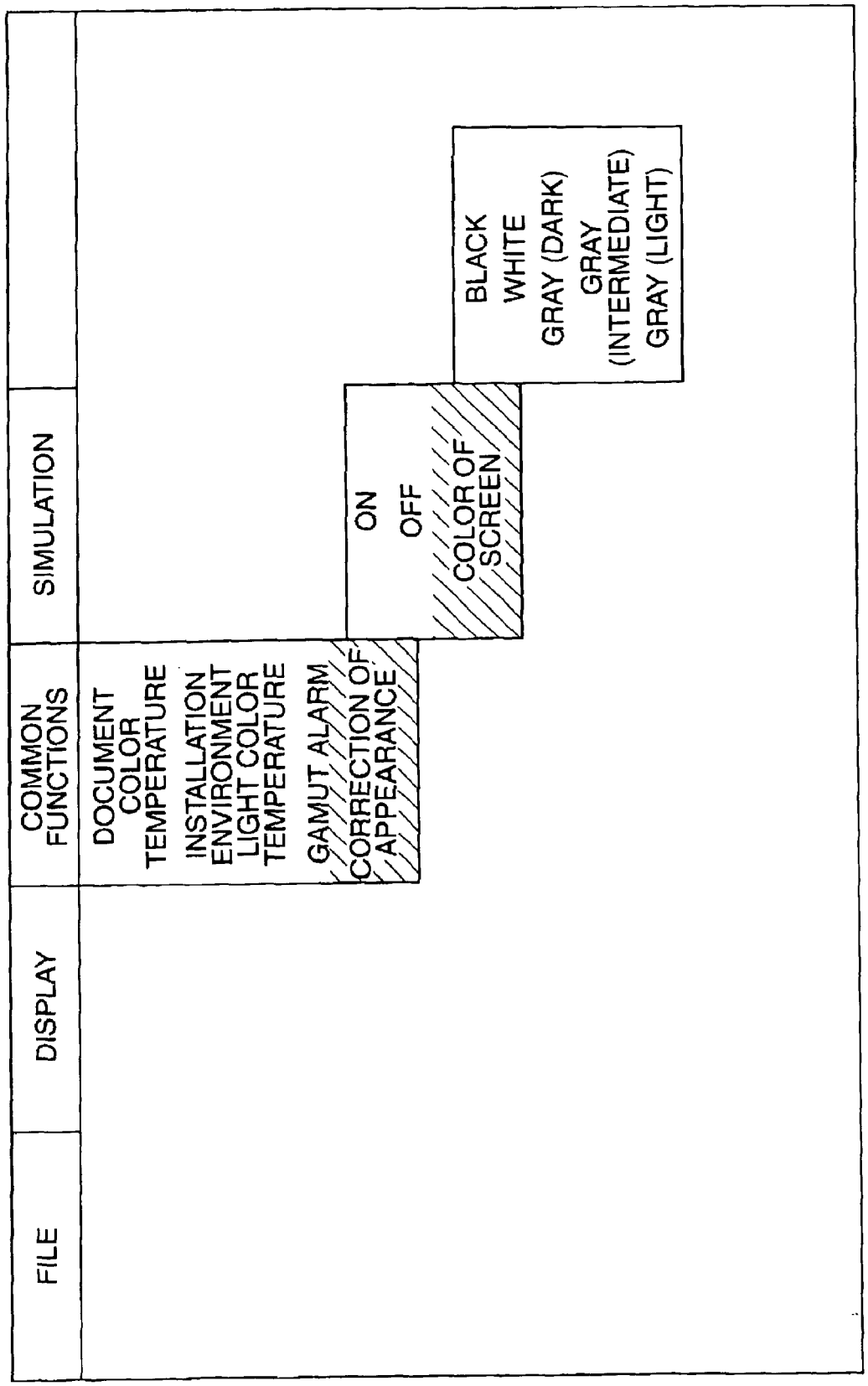
FIG. 22 is a diagram showing an example of user interface for switching the function of a display device.
Figure 23A:
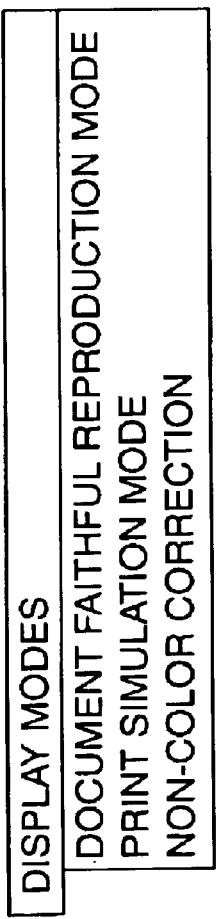
FIGS. 23A and 23B are diagrams for explaining examples of display modes and items of common functions in an example of user interface for switching the function of the display device.
Figure 23B:
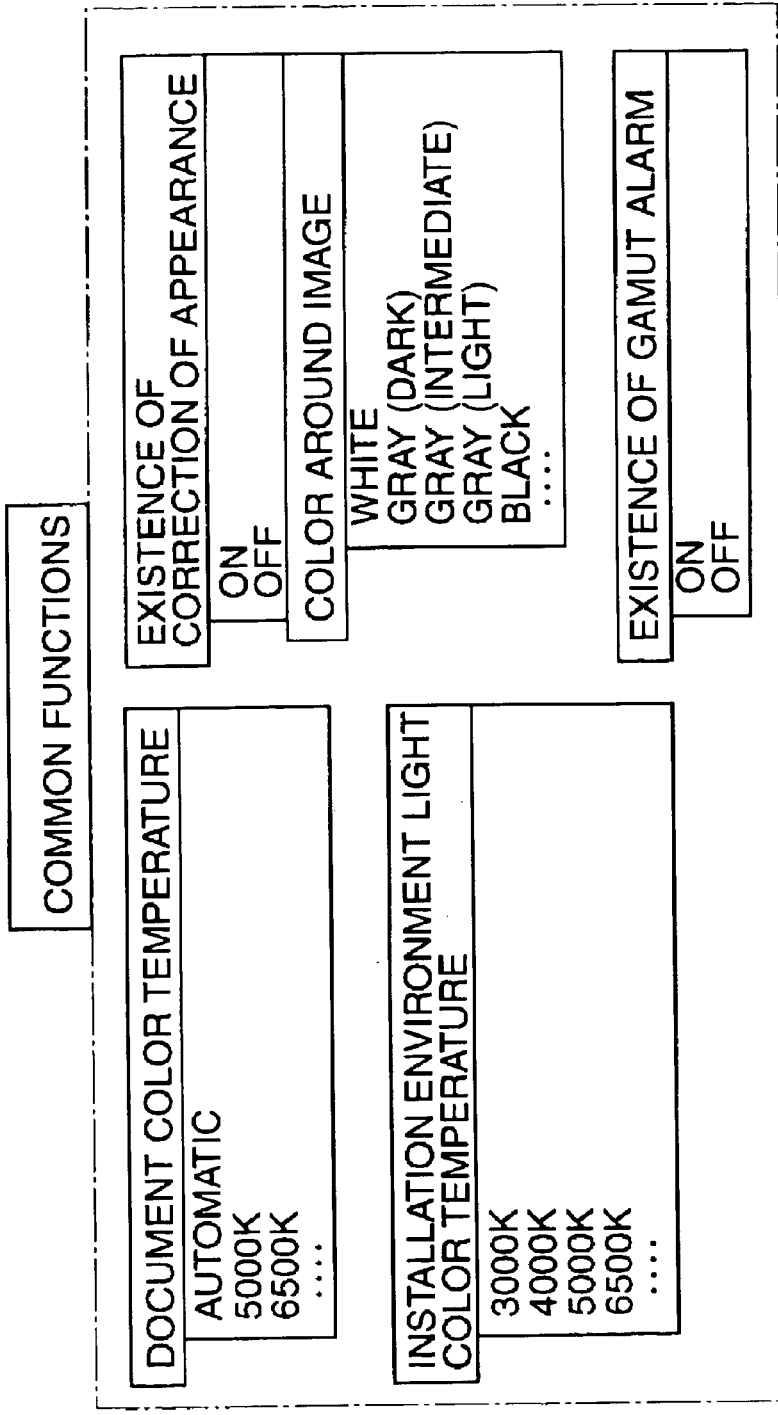
Figure 24A:
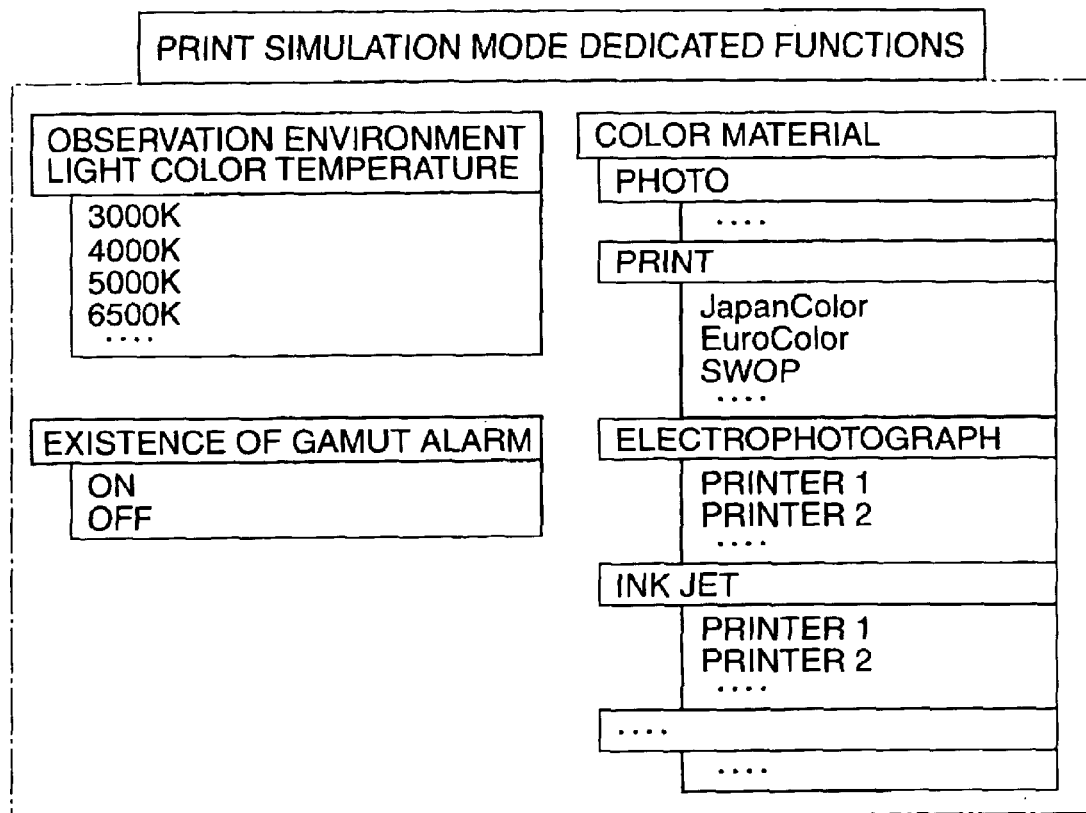
FIGS. 24A and 24B are diagrams for explaining examples of items of print simulation mode dedicated functions and external information input functions in the example of user interface for switching the function of the display device.

FIGS. 22 to 24 are diagrams for explaining an example of user interface for switching the functions of the display device. A user interface which enables a user to switch between a document faithful reproduction mode and a print simulation mode as described in the second and third embodiments can be accessed from a pull-down menu on the display screen as shown in FIG. 22, for example. The contents of items selectable from the pull-down menu are shown in FIGS. 23A and 23B and FIG. 24. In the display mode shown in FIG. 23A out of these, the above document faithful reproduction mode, print simulation mode or non-color correction processing can be selected. As common functions when color correction processing is carried out, document color temperature, set environment light color temperature, the existence of correction of appearance and the existence of a gamut (color reproduction range) alarm as shown in FIG. 23B can be set. By setting "automatic" for document color temperature, the color temperature information of the electronic document is recognized by the electronic document color temperature information recognition unit 1. When the appearance is to be corrected, the color of the display screen can be set. According to the color of the display screen, color actually perceived by a human being changes from displayed color. To correct this appearance, the color of the display screen can be set.

In the document faithful reproduction mode, an image on the document can be reproduced on the display screen only by setting these common functions. Since conditions for reference to the recorded product are set in the case of the print simulation mode, print simulation mode dedicated functions as shown in FIG. 23A can be set. In this case, observation environment light color temperature, color material and the existence of a gamut alarm can be set. Out of these, a color material used to form a recorded product can be set so that the appearance can be corrected according to each color material.

Figure 24B:
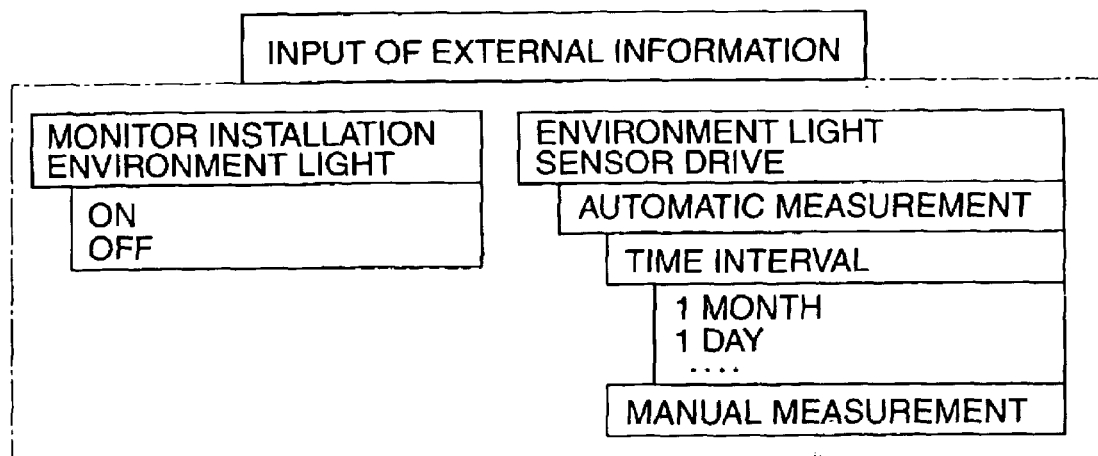

Further in this example, a menu as shown in FIG. 24B is prepared so that functions for automatically taking in information on the environment of the display device 6 can be set. The existence of monitor installation environment light can be set and an environment light sensor can be driven (automatically or manually).

As a matter of course, these functions are just examples and only some of them may be made available or other various functions may be added. In this example, the pull-down menu is used as an example. If the above settings can be made, a pop-up type or dialog type menu may be used.

Further, an item for selecting color temperature information may be realized by using other name for the sake of convenience or by specifying other physical quantity.

FIG. 25 and FIGS. 26A, 26B and 26C are diagrams for explaining an example of user interface for switching the functions of the output device. A user interface which enables a user to switch between the document faithful reproduction mode and the print simulation mode as explained in the first and fourth embodiments enables a switching instruction to be made from a dialog as shown in FIG. 25 displayed on a terminal when a record output is to be instructed. The contents of items selectable by this dialog are shown in FIGS. 26A, 26B and 26C. In an output mode shown in FIG. 26A out of these, the above document faithful reproduction mode, print simulation mode or non-color correction processing can be selected. By setting "automatic" for document color temperature shown in FIG. 26B, the color temperature information of the electronic document is recognized by the electronic document color temperature information recognition unit 1. In the document faithful reproduction mode, a recorded product having a faithfully reproduced image of the document can be obtained by this setting.

In the case of the print simulation mode, print simulation mode dedicated functions as shown in FIG. 26C can be set to set conditions for reference to a recorded product. In this example, observation environment light color temperature, color material, the existence of a gamut alarm and the like can be set. Out of these, a color material used to form a recorded product (second recorded product) can be set so that the appearance can be corrected according to the color material.

As a matter of course, these functions are just examples and only some of them may be made available or other various functions may be added. In this example, the pull-down menu is used as an example. If the above settings can be made, a pop-up type or dialog type menu may be used. Further, an item for selecting color temperature information may be realized by using other name for the sake of convenience or by specifying other physical quantity.

Figure 27:
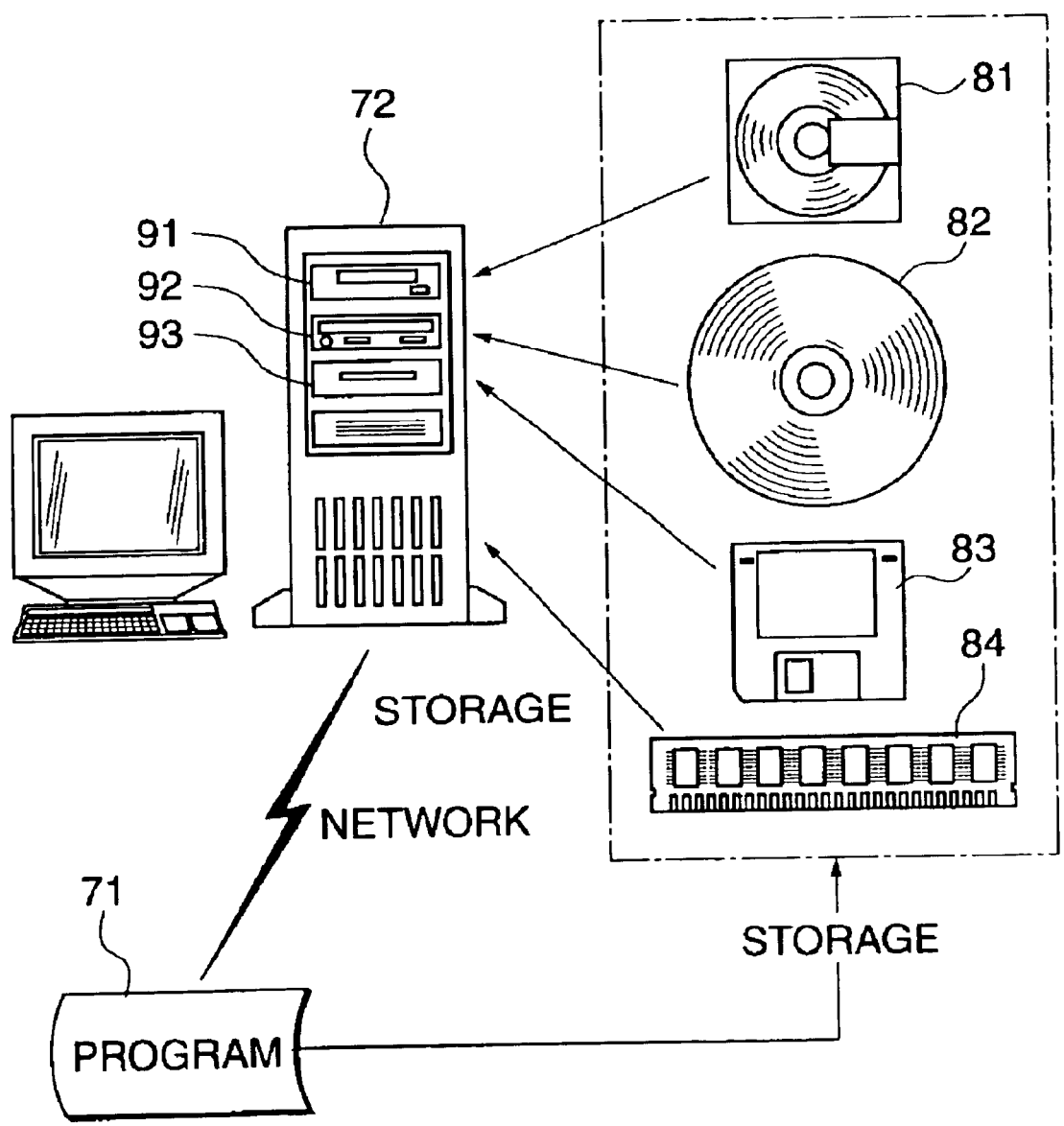
FIG. 27 is a diagram for explaining examples of storage medium which stores a computer program which realizes the functions of each of the above embodiments of the present invention and further the functions of the user interface.
Figure 28:
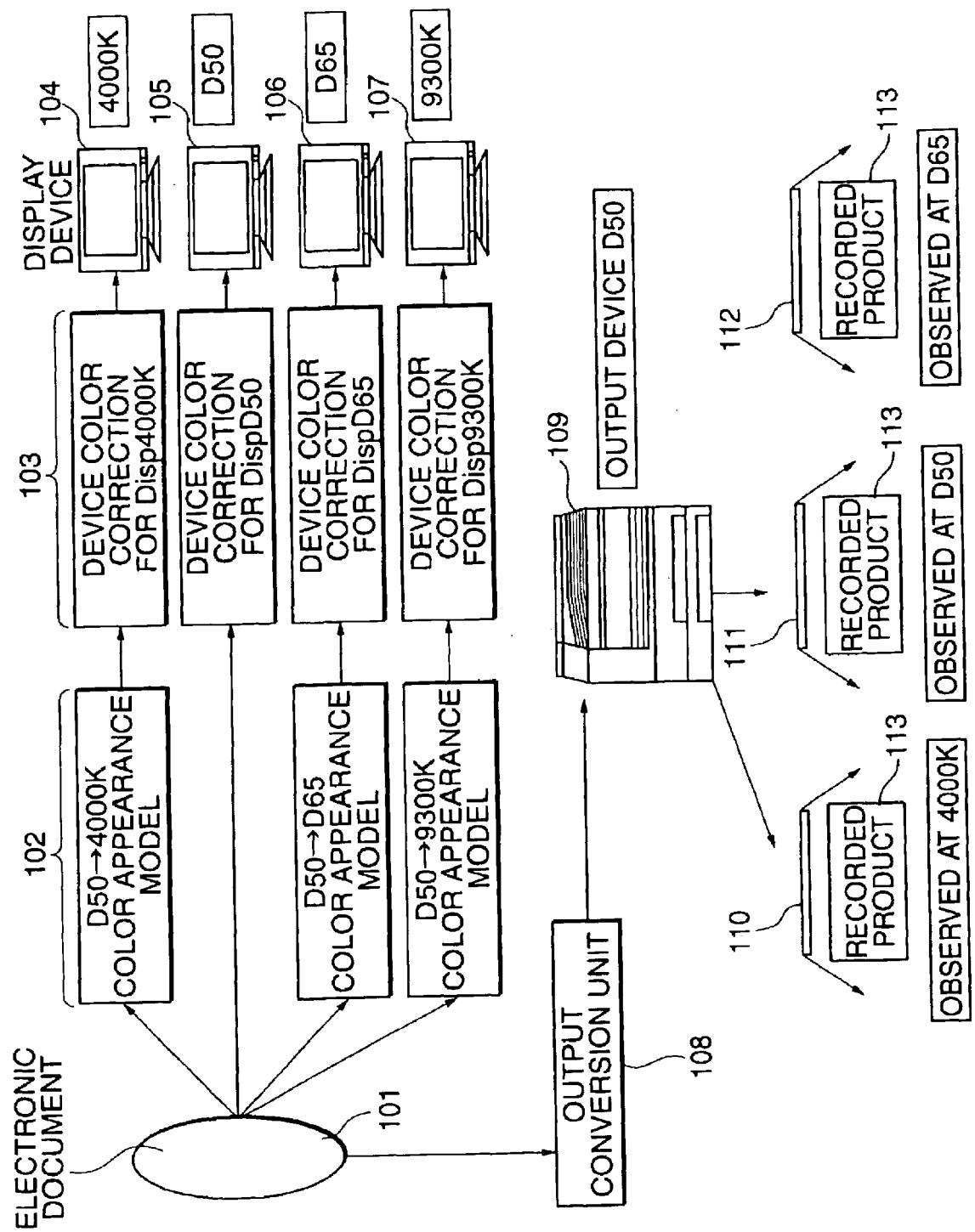
FIG. 28 is a diagram for explaining an example of conventional color management method proposed by ICC.

FIG. 27 is a diagram for explaining an example of storage medium for storing a computer program which realizes the functions of each of the above embodiments of the present invention and the functions of the user interface. In FIG. 27, reference numeral 71 is a program, 72 computer, 81 optical magnetic disk, 82 optical disk, 83 magnetic disk, 84 memory, 91 optical magnetic disk drive, 92 optical disk drive and 93 magnetic disk drive.

The functions shown in each of the above embodiments of the present invention and the functions of the above user interface can be realized by the program 71 which can be executed by the computer. In this case, the program 71 and the data used by the program can be stored in a storage medium which can be read by a computer. The storage medium causes a change in energy such as magnetism, light or electricity according to the descriptive contents of a program in a reader provided to the hardware resource of a computer to transmit the descriptive contents of the program to the reader in the form of corresponding signals. For example, it is the optical magnetic disk 81, optical disk 82, magnetic disk 83, memory 84 or the like. These storage media are not limited to portable ones.

The program 71 is stored in these storage media and these storage media are loaded into the optical magnetic disk drive 91, optical disk drive 92, magnetic disk drive 93 or an unshown memory slot of the computer 72 to read the program 71 by the computer to execute the functions in each of the embodiments of the present invention or the functions of the user interface. Alternatively, the storage media may be loaded into the computer 72 in advance and the program 71 is transferred to the computer 72 through a network, for example, to store the program 71 in a storage medium and execute it. The computer 72 may be integrated with the output device 3 and the display device 6, or the program stored in the storage medium of another computer is read and transferred to the computer 72 (including a computer integrated with the output device 3, display device 6 and the like) to execute it.

As obvious from the above description, according to the present invention, an image is visualized by carrying out color conversion to guarantee the appearance of the electronic document at the color temperature of the electronic document by means of the output device by recognizing the color temperature of the electronic document. Therefore, the appearance of color described in the electronic document can be reproduced faithfully by the output device.

The appearance of a recorded product under a light source for observing a recorded product is simulated and the color of the recorded product can be accurately reproduced on the display device by recognizing the color temperature of the electronic document, recognizing color temperature under the light source for observing the recorded product corresponding to the electronic document and carrying out color conversion according to the color temperatures of the electronic document and the recorded product. Similarly, the appearance of the second recorded product is simulated with the first recorded product and can be accurately reproduced by recognizing the color temperature of the electronic document, recognizing the color temperature of the second recorded product having different color reproducibility from that of the first recorded product under the light source for observing the second recorded product and carrying out color conversion according to the color temperatures of the electronic document and the second recorded product.

What is claimed is:

1. An image processing device for converting an electronic document into an image signal for visualizing the electronic document, comprising:

an electronic document color temperature information recognition part which recognizes color temperature information of the electronic document; and a color correction conversion part which carries out color conversion from the electronic document into an image signal for visualizing an image having substantially the same color as the electronic document based on the color temperature information of the electronic document recognized by the electronic document color temperature information recognition part.

2. The image processing device according to claim 1, wherein the device comprises, as the color correction conversion part, a first color correction conversion part which carries out color conversion from the electronic document into an image signal which can be output to an output device for producing a recorded product based on the color temperature information of the electronic document recognized by the electronic document color temperature information recognition part to ensure that when the recorded product having an image corresponding to the electronic document formed thereon is observed under an illumination light source having a color temperature indicated by the color temperature information of the electronic document, the recorded product assumes substantially the same color as the electronic document.

3. The image processing device according to claim 2, wherein the first color correction conversion part comprises:

a color conversion coefficient storage part which stores at least one color conversion coefficient;

a color conversion coefficient management part which selects an appropriate color conversion coefficient from the color conversion coefficient storage part based on the color temperature information of the electronic document obtained by the electronic document color temperature information recognition part or creates a new color conversion coefficient from the at least one color conversion coefficient stored in the color conversion coefficient storage part; and a color conversion part which carries out color conversion from the electronic document into an image signal which can be output to the output device using the color conversion coefficient selected or created by the color conversion coefficient management part.

4. The image processing device according to claim 2, wherein the first color correction conversion part comprises:

a common color temperature conversion coefficient storage part which stores at least one color conversion coefficient;

a common color temperature conversion coefficient management part which selects an appropriate color conversion coefficient from the common color temperature conversion coefficient storage part based on the color temperature information of the electronic document obtained by the electronic document color temperature information recognition part or creates a new color conversion coefficient from the at least one color conversion coefficient stored in the common color temperature conversion coefficient storage part;

a common color temperature conversion part which carries out color conversion from the electronic document into the image signal having a common color temperature using the color conversion coefficient selected or created by the common color temperature conversion coefficient management part; and a common color conversion part which carries out color conversion from the image signal having the common color temperature into an image signal which can be output to the output device using a color conversion coefficient corresponding to the common color temperature which is targeted when color conversion is carried out by the common color temperature conversion part.

5. The image processing device according to claim 1 wherein, as the color correction conversion part, the device comprises a second color correction conversion part which carries out color conversion from the electronic document into an image signal which can be output to a display device based on the color temperature information of the electronic document recognized by the electronic document color temperature information recognition part to ensure that a display image is displayed in substantially the same color as the electronic document at a color temperature indicated by the color temperature information of the electronic document irrespective of setting of the color temperature of a light source for illuminating the display device and therearound.

6. The image processing device according to claim 5, wherein the second color correction conversion part comprises:

a color conversion coefficient storage part which stores at least one conversion coefficient;

a color conversion coefficient management part which selects an appropriate color conversion coefficient from the color conversion coefficient storage part based on the color temperature information of the electronic document obtained by the electronic document color temperature information recognition part or creates a new color conversion coefficient from the at least one color conversion coefficient stored in the color conversion coefficient storage part; and a color conversion part which carries out color conversion from the electronic document into an image signal which can be output to the display device using the color conversion coefficient selected or created by the color conversion coefficient management part.

7. The image processing device according to claim 5, wherein the second color correction conversion part comprises:

a common color temperature conversion coefficient storage part which stores at least one color conversion coefficient;

a common color temperature conversion coefficient management part which selects an appropriate color conversion coefficient from the common color temperature conversion coefficient storage part based on the color temperature information of the electronic document obtained by the electronic document color temperature information recognition part or creates a new color conversion coefficient from the at least one color conversion coefficient stored in the common color temperature conversion coefficient storage part;

a common color temperature conversion part which carries out color conversion from the electronic document into an image signal having a co common color temperature using the color conversion coefficient selected or created by the common color temperature conversion coefficient management part; and a common color conversion part which carries out color conversion from the image signal having the common color temperature into an image signal which can be output to the display device using a color conversion coefficient corresponding to the common color temperature which is targeted when color conversion is carried out by the common color temperature conversion part.

8. A computer readable storage medium which stores a program of instructions for causing a computer to execute a function for image processing for converting an electronic document into an image signal for visualizing the electronic document, the function comprising the steps of:

recognizing color temperature information of the electronic document; and carrying out color conversion from the electronic document into an image signal for visualizing an image having substantially the same color as the electronic document based on the recognized color temperature information of the electronic document.

9. The computer readable storage medium according to claim 8, wherein the color conversion is performed by carrying out first color conversion from the electronic document into an image signal which can be output to an output device for producing a recorded product based on the recognized color temperature information of the electronic document to ensure that when a recorded product having an image corresponding to the electronic document formed thereon is observed under an illumination light source having a color temperature indicated by the color temperature information of the electronic document, the recorded product assumes substantially the same color as the electronic document.

10. The computer readable storage medium according to claim 8, wherein the color conversion is performed by carrying out second color conversion from the electronic document into an image signal which can be output to a display device based on the recognized color temperature information of the electronic document to ensure that a display image is displayed in substantially the same color as the electronic document at a color temperature indicated by the color temperature information of the electronic document irrespective of setting of the color temperature of a light source for illuminating the display device and therearound.

11. An image processing method for converting an electronic document into an image signal for visualizing the electronic document, comprising the steps of:

recognizing color temperature information of the electronic document; and carrying out color conversion from the electronic document into an image signal for visualizing an image having substantially the same color as the electronic document based on the recognized color temperature information of the electronic document.

12. The image processing method according to claim 11, wherein first color conversion from the electronic document into an image signal which can be output to an output device for producing a recorded product is carried out based on the recognized color temperature information of the electronic document as the color conversion to ensure that when a recorded product having an image corresponding to the electronic document formed thereon is observed under an illumination light source having a color temperature indicated by the color temperature information of the electronic document, the recorded product assumes substantially the same color as the electronic document.

13. The image processing method according to claim 11, wherein second color conversion from the electronic document into an image signal which can be output to a display device is carried out based on the recognized color temperature information of the electronic document as the color conversion to ensure that a display image is displayed substantially the same color as the electronic document at a color temperature indicated by the color temperature information of the electronic document irrespective of setting of color temperature of a light source for illuminating the display device and therearound.

* * * * *